(12) United States Patent
Kang et al.

(10) Patent No.: US 10,067,714 B2
(45) Date of Patent: Sep. 4, 2018

(54) DATA STORAGE DEVICE AND DATA PROCESSING SYSTEM HAVING THE SAME

(71) Applicant: Samsung Electronics Co., Ltd., Suwon-si, Gyeonggi-do (KR)

(72) Inventors: Nam Wook Kang, Hwasong-si (KR); Yang Sup Lee, Yongin-si (KR); Da Woon Jung, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 125 days.

(21) Appl. No.: 15/176,576

(22) Filed: Jun. 8, 2016

(65) Prior Publication Data

US 2016/0371034 A1 Dec. 22, 2016

(30) Foreign Application Priority Data

Jun. 22, 2015 (KR) ........................ 10-2015-0088538

(51) Int. Cl.
| | |
|---|---|
| *G06F 12/02* | (2006.01) |
| *G06F 3/06* | (2006.01) |
| *G06F 13/28* | (2006.01) |
| *G06F 12/06* | (2006.01) |
| *G06F 11/00* | (2006.01) |

(52) U.S. Cl.
CPC ............ *G06F 3/0656* (2013.01); *G06F 3/061* (2013.01); *G06F 3/0631* (2013.01); *G06F 3/0647* (2013.01); *G06F 3/0659* (2013.01); *G06F 3/0685* (2013.01); *G06F 11/00* (2013.01); *G06F 12/0246* (2013.01); *G06F 12/0615* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 8,055,816 B2 | 11/2011 | Asnaashari et al. | |
| 8,291,295 B2 | 10/2012 | Harari et al. | |
| 8,429,337 B2 | 4/2013 | Koh | |
| 8,595,411 B2 | 11/2013 | Selinger et al. | |
| 8,683,148 B2 | 3/2014 | Raz et al. | |
| 8,819,328 B2 | 8/2014 | Lassa et al. | |
| 2008/0235443 A1* | 9/2008 | Chow ................. | G06F 12/0851 711/103 |
| 2010/0250826 A1* | 9/2010 | Jeddeloh ............. | G06F 13/1684 711/103 |

(Continued)

*Primary Examiner* — Kaushikkumar Patel
(74) *Attorney, Agent, or Firm* — Harness, Dickey & Pierce, P.L.C.

(57) ABSTRACT

A data storage device includes a first controller; a scale-out storage device; and an interface connected between the first controller and the scale-out storage device, wherein the first controller is configured to transmit, to the scale-out storage device through the interface, a first command including a command type and command information having a parameter with respect to the command type, wherein the scale-out storage device is configured to perform an operation corresponding to the first command, and wherein the scale-out storage device includes, a scale-out controller connected to the interface, a volatile memory connected to the scale-out controller, and a non-volatile memory connected to the scale-out controller.

17 Claims, 31 Drawing Sheets

(56) References Cited

U.S. PATENT DOCUMENTS

| | | | |
|---|---|---|---|
| 2011/0035540 A1* | 2/2011 | Fitzgerald | G06F 3/061 |
| | | | 711/103 |
| 2011/0040924 A1 | 2/2011 | Selinger | |
| 2011/0167208 A1* | 7/2011 | So | G06F 12/0246 |
| | | | 711/103 |
| 2011/0296131 A1* | 12/2011 | Yim | G06F 12/0246 |
| | | | 711/165 |
| 2012/0233386 A1 | 9/2012 | Tong et al. | |
| 2012/0239852 A1* | 9/2012 | Calvert | G06F 11/1441 |
| | | | 711/103 |
| 2013/0054871 A1 | 2/2013 | Lassa | |
| 2013/0145076 A1* | 6/2013 | Chiueh | G06F 11/1417 |
| | | | 711/103 |
| 2013/0311706 A1* | 11/2013 | Okada | G06F 13/1694 |
| | | | 711/103 |
| 2014/0281138 A1* | 9/2014 | Karamcheti | G06F 12/0246 |
| | | | 711/103 |
| 2015/0012687 A1 | 1/2015 | Huang et al. | |
| 2015/0100744 A1* | 4/2015 | Mirichigni | G06F 12/023 |
| | | | 711/154 |
| 2016/0041868 A1* | 2/2016 | Davis | G06F 11/1008 |
| | | | 714/773 |
| 2016/0062699 A1* | 3/2016 | Samuels | G06F 3/0649 |
| | | | 711/103 |
| 2016/0077911 A1* | 3/2016 | Malshe | G06F 11/1068 |
| | | | 714/773 |
| 2016/0099061 A1* | 4/2016 | Ziperovich | G11C 16/3445 |
| | | | 365/185.11 |

\* cited by examiner

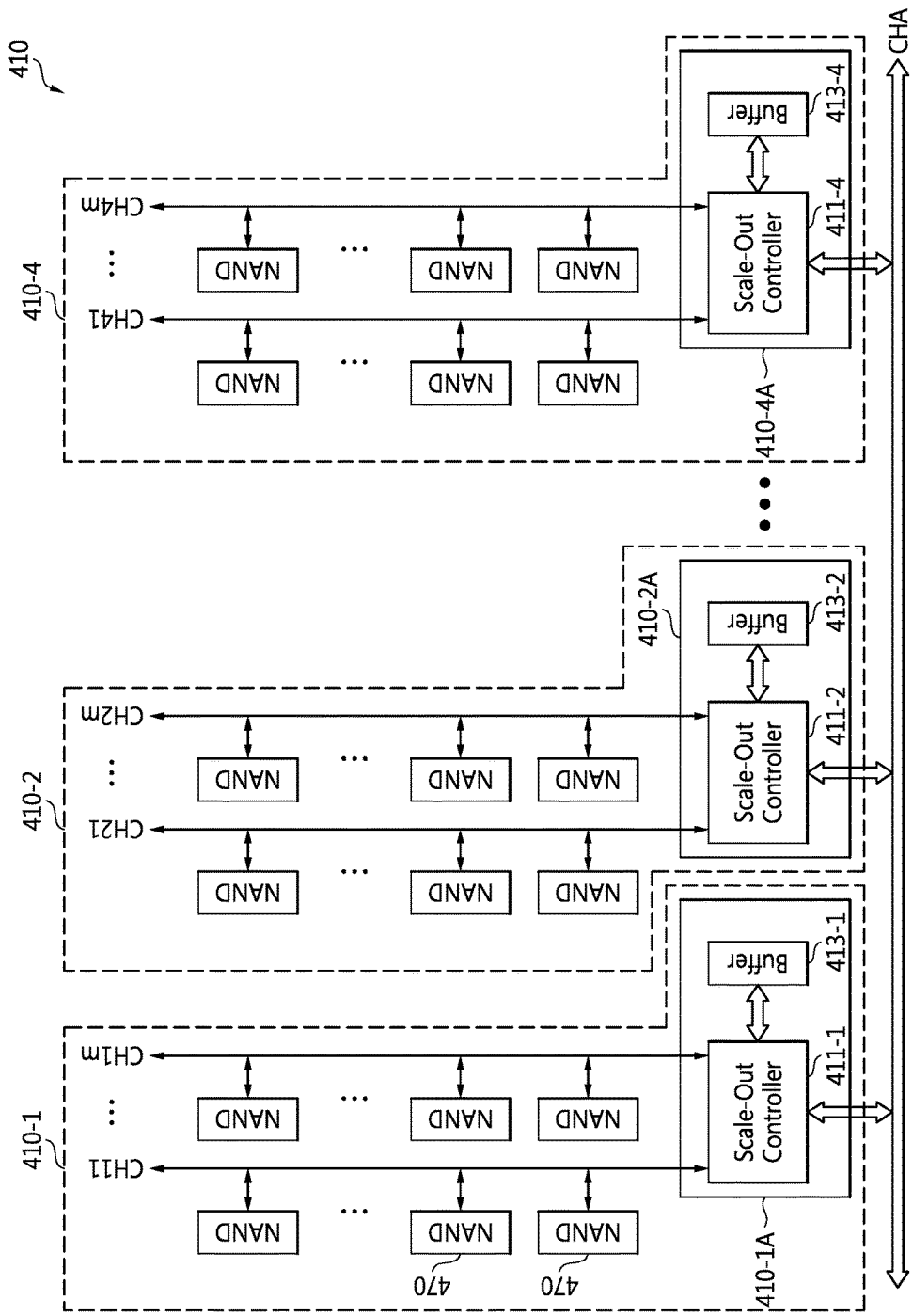

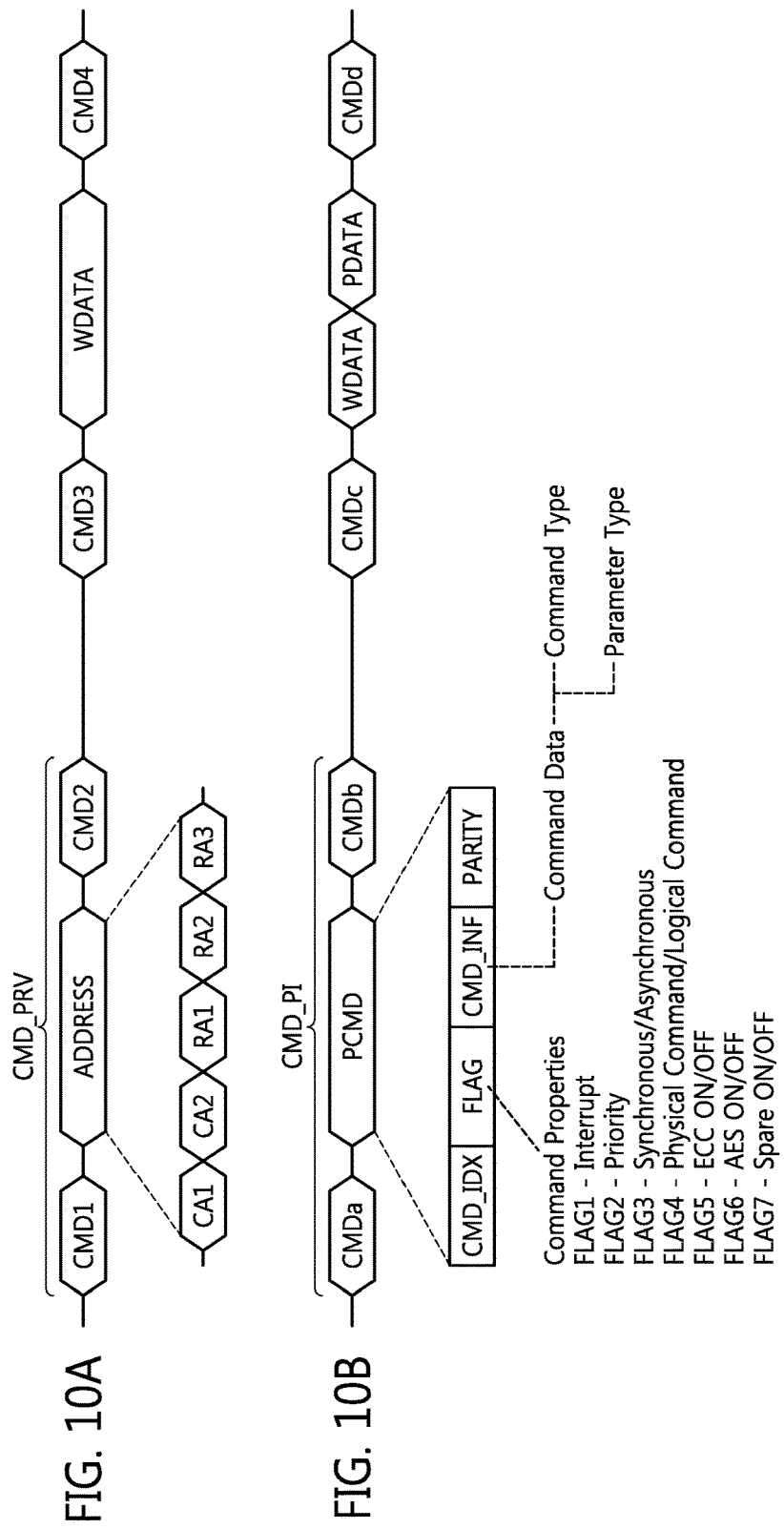

FIG. 11

| Command Type | Parameter Type |
|---|---|
| Write | - Volume Type<br>- Address<br>- Sector Bitmap<br>- DMA Buffer Size |
| Read | - Volume Type<br>- Address<br>- Sector Bit-map<br>- DMA Buffer Size |
| Map Write | - Volume Type<br>- Map Index |
| Map Read | - Volume Type<br>- Map Index |
| Flush | - Volume Type<br>- Flush Index |
| Sanitize | - Volume Type<br>- Sanitize Type<br>- Region Index<br>- Pattern Data |
| Trim | - Volume Type<br>- Start Sector<br>- Sector Count |
| Device Information | - Volume Type |

0 : Command Busy
1 : Command Complete or Ready

0 : No Error
1 : Error

DATA STORAGE DEVICE AND DATA PROCESSING SYSTEM HAVING THE SAME

CROSS-REFERENCE TO RELATED APPLICATION

This application claims priority under 35 U.S.C. § 119 from Korean Patent Application No. 10-2015-0088538 filed on Jun. 22, 2015, the disclosure of which is hereby incorporated by reference in its entirety.

BACKGROUND

1. Field

At least some example embodiments of the inventive concepts relate to a data storage device, and more particularly to a data storage device which can generate a command including command information and process the command based on a new command protocol, and a data processing system having the same.

2. Related Art

A memory device is used to store data, and the memory device is divided into a volatile memory device and a non-volatile memory device. A flash memory device is an example of an EEPROM in which a plurality of memory cells are erased or programmed by one time program operation. For example, programming or reading is performed by page, and erasing is performed by block. A block may include a plurality of pages.

The flash memory device may include a plurality of flash memory chips. Overall durability and performance of the flash memory device may be determined according to one of the plurality of flash memory chips. For example, when one of the plurality of flash memory chips is worn-out or is lowered in performance, overall durability and performance of a flash memory device including the plurality of flash memory chips may be lowered.

SUMMARY

A data storage device includes a first controller; a scale-out storage device; and an interface connected between the first controller and the scale-out storage device, wherein the first controller is configured to transmit a first command to the scale-out storage device through the interface, and the first command includes a command type and command information having a parameter with respect to the command type, wherein the scale-out storage device is configured to perform an operation corresponding to the first command, and wherein the scale-out storage device includes, a scale-out controller connected to the interface, a volatile memory connected to the scale-out controller, and a non-volatile memory connected to the scale-out controller.

The first controller may include a command generator configured to generate the first command, and the command generator may be configured to, further generate parity data that indicates data integrity for the first command, and transmit the first command including the command information and the parity data to the scale-out storage device through the interface.

The command generator may be configured to further generate a command index for facilitating command queuing and a flag indicating an attribute of the first command, and transmit the first command including the command index, the flag, the command information, and the parity data to the scale-out storage device through the interface. The interface may be a NAND interface, the volatile memory may be a dynamic random access memory (DRAM), the non-volatile memory may be a NAND flash memory, and the data storage device may a solid state drive (SSD). The first command may be transmitted in address cycles. The scale-out controller may include a command manager configured to allocate the first command to a first slot corresponding to the command index among a plurality of slots and allocates a valid command descriptor buffer among a plurality of command descriptor buffers as a first command descriptor buffer for storing the first command.

The scale-out controller may further include a direct memory access (DMA) manager and the scale-out controller may be configured such that when the first command is a command to access the volatile memory, the DMA manager reads the command information from the first command descriptor buffer referring to the command information stored in the first slot and accesses a memory region of the volatile memory using a memory pointer included in the read command information.

The scale-out controller may further include a direct memory access (DMA) manager and the scale-out controller may be configured such that when the first command is a write command for the volatile memory and write data related to the write command are completely stored in a memory region of the volatile memory, the DMA manager releases the first command descriptor buffer allocated to the command.

The scale-out controller may include a central processing unit (CPU) configured to execute a flash translation layer (FTL) that converts a logical command into a physical command, a memory controller configured to control an operation of the non-volatile memory based on the physical command, and a command parser configured to determine whether the first command is the physical command or the logical command by parsing the first command, and transmit parsed command information to the FTL or to the memory controller according to a result of the determination.

The scale-out controller may further include a command logger which logs at least a portion of the command information, a reception time of the first command, and a completion time of the operation corresponding to the first command.

The first controller may be configured to transmit a first state read command to the scale-out storage device through the interface, the scale-out controller may be configured such that, in response to the first state read command, the scale-out controller transmits state data for each of a plurality of commands queued in the scale-out controller to the first controller through the interface at a time, and the plurality of commands may include the first command.

The plurality of commands may include different types of commands. The plurality of commands may include a same type of commands only.

The state data may include data for a current operation state related to each of the plurality of commands, data for an error state related to each of the plurality of commands, or data for an error type included in data related to each of the plurality of commands.

The state data includes at least one of first state data which indicates whether or not the volatile memory stores data; second state data which indicates whether or not the scale-out storage device further receives a second command output from the first controller; and third state data which indicates how busy the scale-out storage device is.

The first controller may be configured to transmit a second state read command to the scale-out storage device through the interface in response to an abnormal check bit included in the state data, and the scale-out controller may be configured to transmit an error state bitmap for each of the plurality of commands to the first controller through the interface in response to the second state read command.

The first controller may be configured to transmit a second state read command to the scale-out storage device through the interface in response to an abnormal check bit included in the state data, and the scale-out controller may be configured to transmit a message to the first controller through the interface in response to the second state read command.

The data storage device may further include a first central processing unit (CPU) included in the first controller; and a second CPU included in the scale-out controller, wherein a first flash translation layer (FTL) executed by the first CPU transmits inter-processing communication (IPC) data to a second FTL executed by the second CPU through the interface.

The first controller may be configured to transmit a state read command to the scale-out storage device through the interface, the scale-out storage device may be configured to transmit state data related to the first command to the first controller through the interface in response to the state read command, and the first controller may be configured to re-transmit the first command to the scale-out storage device through the interface or transmit instruction data related to the state data to a host based on the state data.

According to at least some example embodiments of the inventive concepts, a data processing system includes a host; and a data storage device connected to the host, wherein the data storage device includes a first controller, a scale-out storage device, and an interface connected between the first controller and the scale-out storage device, wherein the first controller is configured to transmit a first command to the scale-out storage device through the interface, the first command including a command type and command information including a parameter for the command type, wherein the scale-out storage device is configured to perform an operation corresponding to the first command, and wherein the scale-out storage device includes, a scale-out controller connected to the interface, a volatile memory connected to the scale-out controller, and a non-volatile memory connected to the scale-out controller.

The first controller may include a command generator configured to generate the first command, wherein the command generator may be configured to, further generate, a command index for facilitating command queuing, a flag indicating an attribute of the first command, and parity data which indicate data integrity for the first command, and transmit the first command including the command index, the flag, the command information, and the parity data to the scale-out storage device through the interface.

According to at least some example embodiments of the inventive concepts, a data storage device includes a first controller; a storage device; and an interface connected between the first controller and the storage device, the first controller being configured to transmit a plurality of commands to the storage device through the interface, the storage device including a second controller configured to queue the plurality of commands, the first controller being further configured to send a global state read command to the storage device, the second controller being configured to respond to the global state read command by sending global state data to the first controller, the global state data indicating a plurality of statuses of the queued plurality of commands, respectively.

Each command from among the plurality of commands transmitted by the first controller may include a command type and command information having a parameter with respect to the command type, the storage device may be a scale-out storage device configured to perform operations corresponding to the queued plurality of commands, the second controller may be a scale-out controller connected to the interface, and the scale-out storage device may further include a volatile memory connected to the scale-out controller, and a non-volatile memory connected to the scale-out controller.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 3 is a block diagram which shows an example embodiment of a first cluster shown in FIG. 2;

FIG. 10A is a command protocol of the related art, and FIG. 10B is a conceptual diagram of a new command protocol according to at least one example embodiment of the inventive concepts;

FIG. 11 shows at least some example embodiments of a command type and a parameter type included in command information shown in FIG. 10B;

DETAILED DESCRIPTION OF THE EMBODIMENTS

Figure 1:
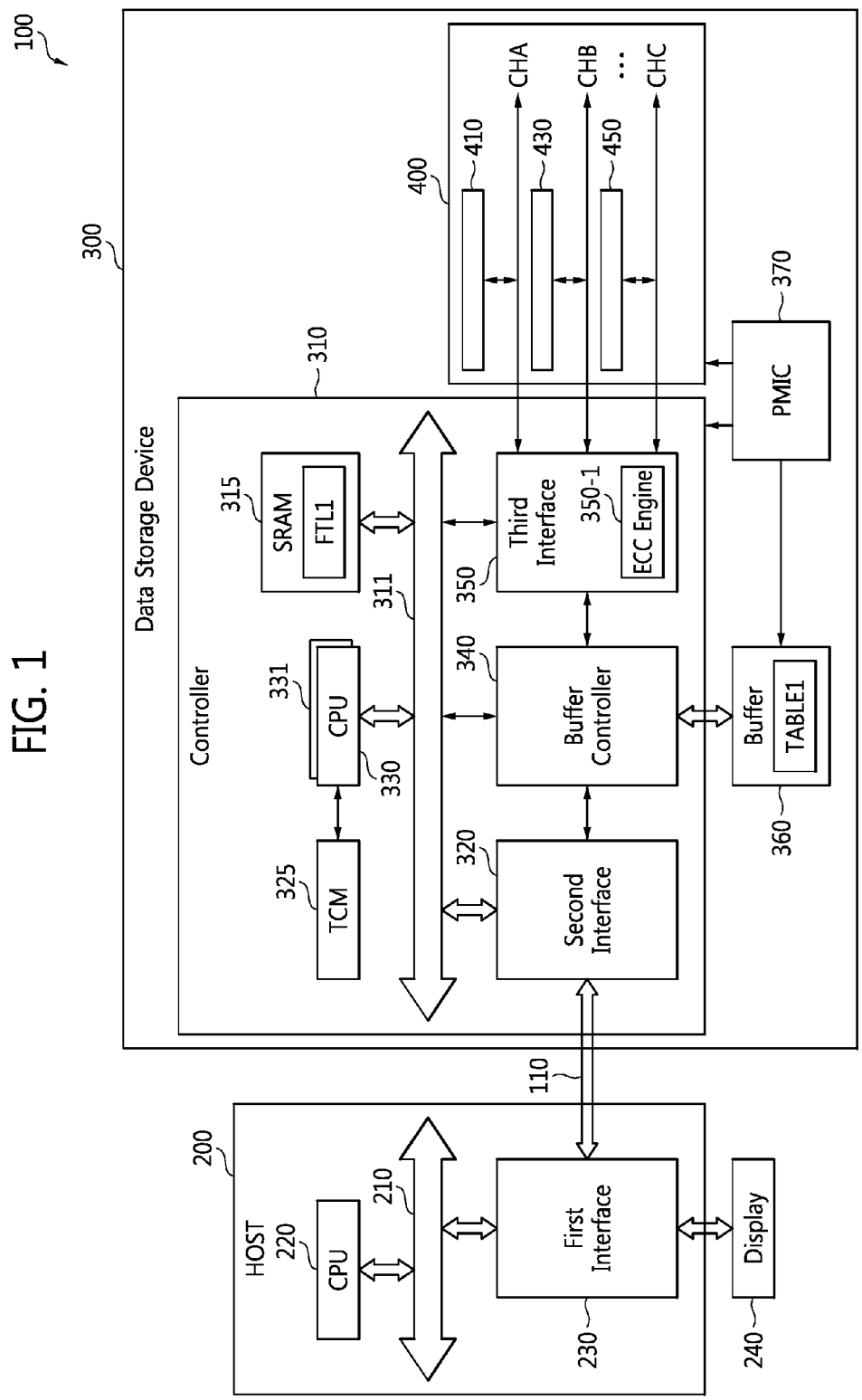
FIG. 1 is a block diagram which shows a data processing system according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Methods of increasing a data processing capability of a data storage device or a data server including the data storage device include a scale-up and a scale-out. The scale-up improves data processing capability of the data server by increasing capacity of the data server itself and is also referred to as vertical scaling. The scale-out improves data processing capability of a system which includes the data server by increasing the number of data servers connected and is also referred to as horizontal scaling.

In a data storage device having the scale-up structure, when the number of non-volatile memory devices included in the data storage device is increased, loading capacitance of an interface embodied between a controller for controlling the non-volatile memory devices and the non-volatile memory devices may be increased. Accordingly, a data processing speed of the data storage device may be lowered.

A data storage device described in the present specification is a data storage device having the scale-out structure. In the present specification, a scale-out storage device may include a volatile memory, at least one non-volatile memory, and a scale-out controller which controls the volatile memory and the at least one non-volatile memory. When each of the volatile memory, the at least one non-volatile memory, and the scale-out controller is embodied in a semiconductor chip or a semiconductor package, the scale-out storage device may be referred to as a multi-chip set. The scale-out controller may be a core.

FIG. 1 is a block diagram which shows a data processing system according to at least one example embodiment of the inventive concepts. Referring to FIG. 1, a data processing system 100 may include a host 200, a display 240 connected to the host 200, and a data storage device 300 which can transmit or receive a command and/or data to or from the host 200 through an interface 110.

Figure 2A:
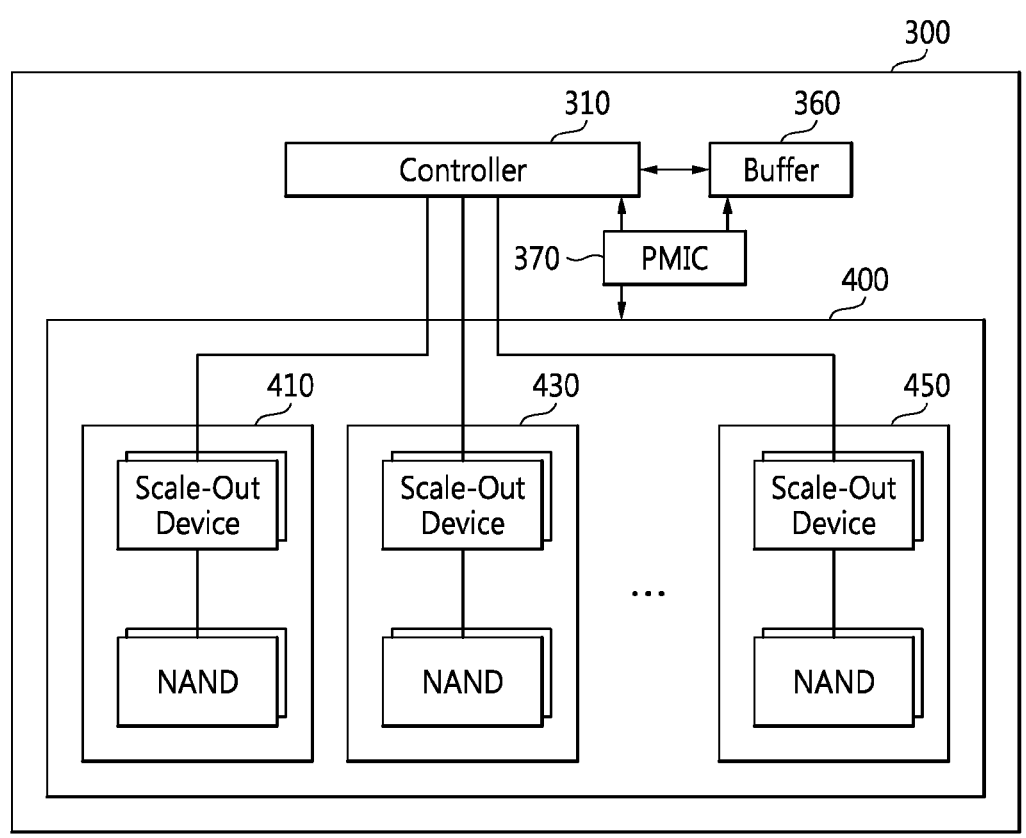
FIG. 2A is an example embodiment of a specific block diagram of a data storage device shown in FIG. 1.
Figure 2B:
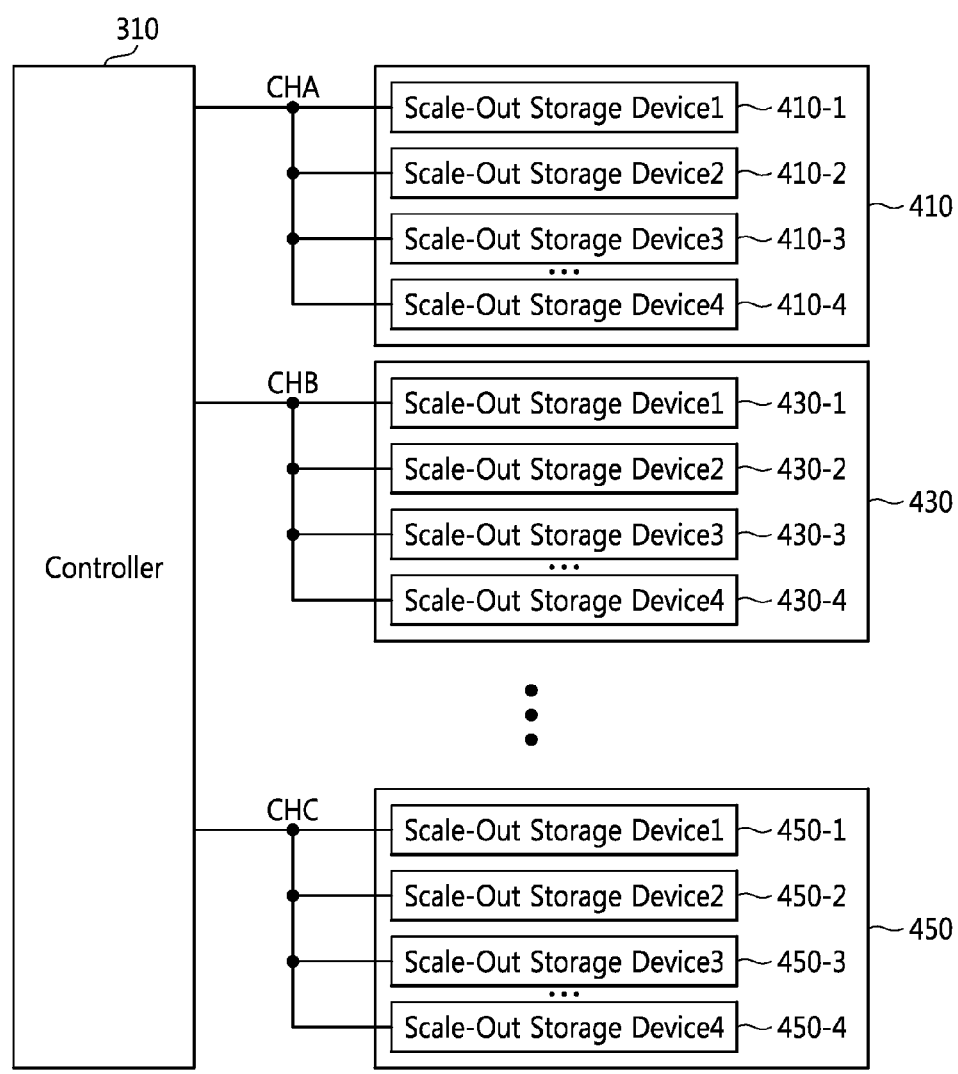
FIG. 2B is at least another example embodiment of the specific block diagram of the data storage device shown in FIG. 1

When a structure of a scale-out storage device cluster 400 included in the data storage device 300 is embodied in a structure shown, as an example, in FIG. 2A or 2B, the data storage device 300 may be embodied in a scale-out structure. For example, the data processing system 100 may be a memory system. According to at least some example embodiments, the data processing system 100 may be embodied in a PC, a workstation, an enterprise storage device, a data center, an internet data center (IDC), a storage area network (SAN), a network attached storage (NAS), or a mobile computing device; however, it is not limited thereto.

A mobile computing device including the scale-out storage device cluster 400 may be embodied, for example, in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book; however, it is not limited thereto.

The interface 110 may be embodied, for example, in a serial advanced technology attachment (SATA) interface, a SATA express (SATAe) interface, a serial attached small computer system interface (SCSI) interface, a peripheral component interconnect express (PCIe) interface, a non-volatile memory Express (NVMe) interface, an advanced host controller interface (AHCI) interface, or a multimedia card (MMC) interface; however, a type of the interface 110 is not limited thereto. According to at least some example embodiments, the interface 110 may transmit electrical signals or optical signals. The interface 110 may be embodied in a wired interface or a wireless interface in some cases.

The host 200 may control a data processing operation (for example, a write or read operation) of the data storage device 300 through the interface 110. The host 200 may be a host controller.

The CPU 220 and the first interface 230 may transmit or receive a command and/or data to or from each other through a bus architecture (or a bus) 210. Even if the host 200 including the bus architecture 210, the CPU 220, and the first interface 230 is shown in FIG. 1; however, at least some example embodiments of the inventive concepts are not limited to the host 200 shown in FIG. 1.

According to at least one example embodiment of the inventive concepts, the host 200 may be embodied in, for example, an integrated circuit (IC), a motherboard, a system on chip (SoC), an application processor (AP), a mobile AP, chip set, a web server, a data server, or a data base server; however, it is not limited thereto. For example, the bus architecture 210 may be embodied in an advanced microcontroller bus architecture (AMBA), an advanced high-performance bus (AHB), an advanced peripheral bus (APB), an advanced eXtensible interface (AXI), an advanced system bus (ASB), an AXI Coherency Extensions (ACE), or a combination of these; however, it is not limited thereto.

The CPU 220 may generate a write request for controlling a write operation of the data storage device 300 or a read request for controlling a read operation of the data storage device 300. The write request may include a write address (for example, a logical address), and the read request may include a read address (for example, a logical address). For example, the CPU 220 may include one or more cores. A request may be a command.

The first interface 230 may change a format of a command and/or data to be transmitted to the data storage device 300, and transmit the command having a changed format and/or the data having a changed format to the data storage device 300 through the interface 110. Moreover, the first interface 230 may change a format of a response and/or data transmitted to the data storage device 300, and transmit the response having a changed format and/or the data having a changed format to the CPU 220 through the bus architecture 210. According to at least one example embodiment of the inventive concepts, the first interface 230 may include a transceiver for transmitting or receiving a command and/or data. A structure and an operation of the first interface 230 may be embodied to be compatible with a structure and an operation of the interface 110.

The first interface 230 may control an operation of the display 240, and transmit user data input through a touch screen or a touch pad included in the display 240 to the CPU 220. Accordingly, the first interface 230 may be a collective interface which includes a first device for transmitting or receiving a command and/or data to or from the data storage device 300 and a second device for controlling the display 240. Even if the first device and the second device are shown in a combined structure in FIG. 1; however, the second device may be a display controller.

The data storage device 300 may include a controller 310, a buffer 360, a power management IC 370, and the scale-out storage device cluster 400. Here, the scale-out storage device cluster 400 may be a set of scale-out storage devices. Moreover, the scale-out storage device cluster 400 may include scale-out devices and memory devices as shown in FIGS. 2A to 7.

The data storage device 300 may be embodied in a flash memory-based memory device; however, it is not limited thereto. For example, the data storage device 300 may be embodied in a solid-state drive or solid-state disk (SSD), an embedded SSD (eSSD), a universal flash storage (UFS), a multimedia card (MMC), an embedded MMC (eMMC), or a managed NAND; however, it is not limited thereto. For example, the flash memory-based memory device may be embodied in a NAND-type flash memory device or a NOR-type flash memory device. For example, the data storage device may be embodied in an all-in-one structure.

The flash memory-based memory device may include a memory cell array. The memory cell array may include a plurality of memory cells. For example, the memory cell array may include a two-dimensional memory cell array or a three-dimensional memory cell array.

The three-dimensional memory cell array may include a circuit which is monolithically formed in one or more physical levels of an array of memory cells having an active region disposed on or above a silicon substrate and is related to an operation of the memory cells. The circuit may be formed in the substrate, or on or above the substrate. A term of "monolithic" means that layers of each level of an array are directly deposited on layers of each underlying level of the array. A three-dimensional memory cell array may include a vertical NAND string which is vertically oriented so that at least one memory cell is positioned on or above another memory cell. The at least one memory cell may include a charge trap layer.

According to at least some example embodiments, the data storage device 300 may be embodied in a hard disk drive (HDD), a phase change RAM (PRAM) device, a magnetoresistive RAM (MRAM) device, a spin-transfer torque MRAM (STT-MRAM) device, a ferroelectric RAM (FRAM) device, or a resistive RAM (RRAM) device; however, it is not limited thereto. The controller 310 may control transmission or processing of a command and/or data transmitted or received between the host 200, the buffer 360, and the scale-out storage device cluster 400. According to at least some example embodiments, the controller 310 may be embodied in an IC, a chipset, or a SoC.

The controller 310 may include a bus architecture 311, an internal memory 315, a second interface 320, a tightly coupled memory (TCM) 325, at least one CPU 330 and/or 331, a buffer controller 340, and a third interface 350.

The bus architecture 311 may be embodied in AMBA, AHB, APB, AXI, ASB, ACE, or a combination of these; however, it is not limited thereto.

Figure 13:
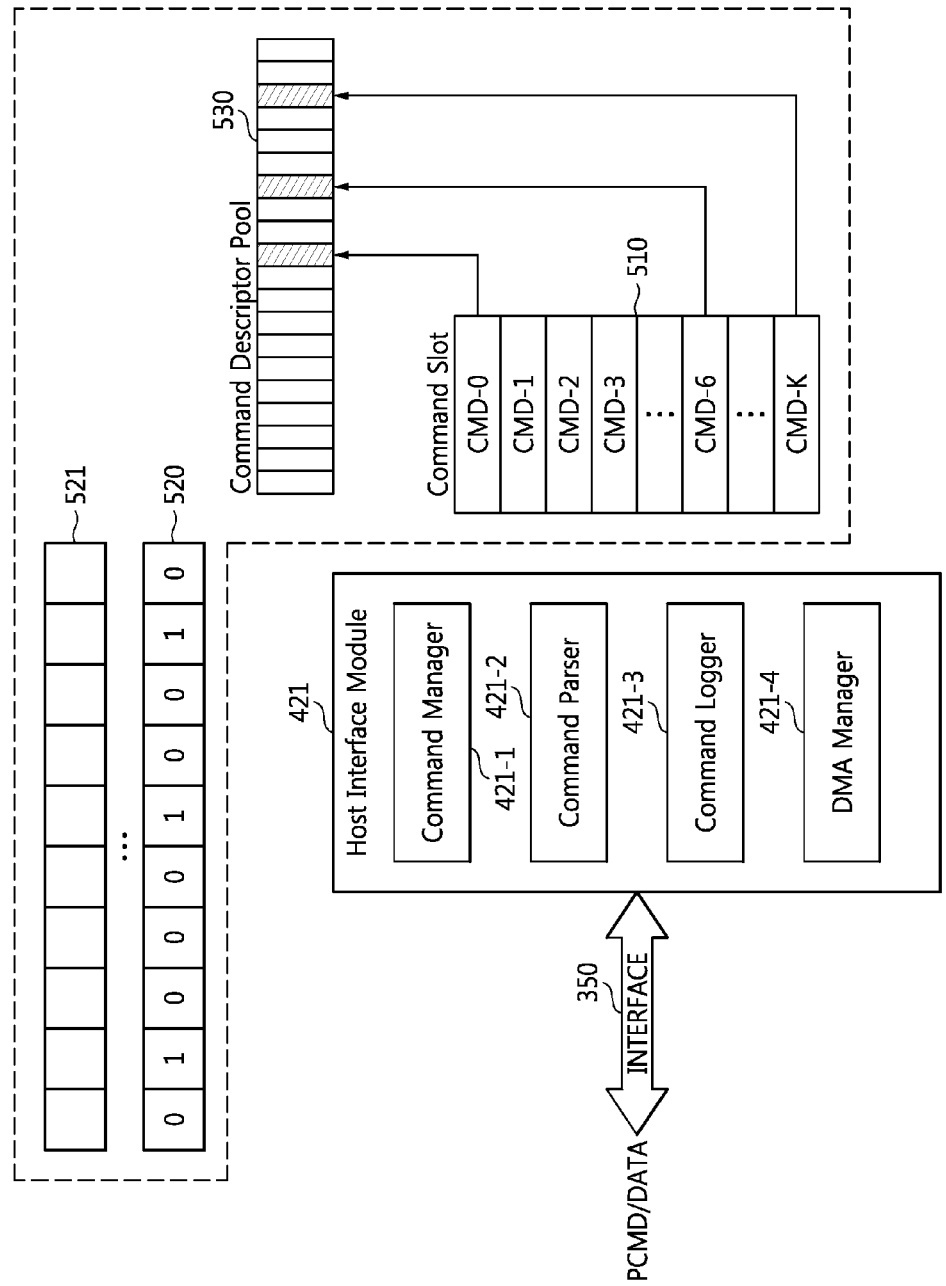
FIG. 13 is a conceptual diagram which describes a structure and an operation of a fourth interface in FIG. 7.

The TCM 325 may include a command slot 510 to be described referring to FIG. 13, state data registers 520, . . . , 521, and a command descriptor pool 530; however, it is not limited thereto.

The internal memory 315 may store data necessary for an operation of the controller 310 or data generated by a data processing operation (e.g., a write operation or a read operation) performed by the controller 310.

For example, the internal memory 315 may store a first flash translation layer (FTL1) which can be executed by the CPU 330 and/or 331. The first FTL (FTL1) may be loaded to the internal memory 315 from the scale-out storage device cluster 400 and may be executed by the CPU 330 and/or 331 when the data storage device 300 is booted.

According to at least some example embodiments, the internal memory 315 may be embodied in a random access memory (RAM), a dynamic RAM (DRAM), a static RAM (SRAM), a buffer, a buffer memory, or a cache; however, a type of the internal memory 315 is not limited thereto.

The second interface 320 may change a format of a response and/or data to be transmitted to the host 200, and transmit the response having a changed format and/or the data having a changed format to the host 200 through the interface 110. Moreover, the second interface 320 may receive a command and/or data transmitted from the host 200, change a format of a received command and/or received data, and transmit the command having a changed format and/or the data having a changed format to at least one CPU 330 and/or 331 and/or the buffer controller 340. According to at least one example embodiment of the inventive concepts, the second interface 320 may include a transceiver for transmitting or receiving a signal and/or data.

A structure and an operation of the second interface 320 may be embodied to be compatible with the structure and the operation of the interface 110. For example, the second interface 320 may be embodied in a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto.

One or more CPUs 330 and/or 331 may control the internal memory 315, the second interface 320, the buffer controller 340, and a third interface 350 through the bus architecture 311. Each of the CPUs 330 and 331 may include one or more cores. According to at least one example embodiment of the inventive concepts, one or more CPUs 330 and/or 331 may control the PMIC 370.

For example, a first CPU 330 may transmit or receive a command and/or data to or from the host 200 through the second interface 320. A second CPU 331 may transmit or receive a command and/or data to or from the scale-out storage device cluster 400 through the third interface 350. According to at least one example embodiment of the inventive concepts, the first CPU 330 and the second CPU 331 may configure a multi-CPU. According to at least one example embodiment of the inventive concepts, the first CPU 330 may control the second CPU 331; however, it is not limited thereto.

The buffer controller 340 may write data in the buffer 360 or read data from the buffer 360 according to a control of the first CPU 330 or the second CPU 331. The buffer controller 340 may be referred to as a controller or a buffer manager which can control a write operation and a read operation for the buffer 360.

The third interface 350 may control data processing operations (e.g., write operations, read operations, command state data read operations, and so on) for the scale-out storage device cluster 400 through a corresponding main channel among a plurality of main channels CHA, CHB, . . . , CHC according to a control of the first CPU 330 or the second CPU 331.

According to at least some example embodiments, the third interface 350 may be embodied in a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto.

The third interface 350 may transmit a command CMD_PI according to a new protocol to be described referring to FIG. 10B, transmit a state read command, or receive state data.

For example, the third interface 350 may include an error correction code (ECC) engine 350-1. The ECC engine 350-1 may correct an error included in data to be stored in the scale-out storage device cluster 400 and/or data output from the scale-out storage device cluster 400. Even if it is shown that the ECC engine 350-1 is included in the third interface 350 in FIG. 1; however, the ECC engine 350-1 may be embodied in anywhere in the controller 310 According to at least some example embodiments.

According to at least one example embodiment of the inventive concepts, each of the interfaces described in the present disclosure may include a circuit or circuitry, may be embodied by a circuit or circuitry, or, alternatively, may be implemented by a processor executing instructions included in program code stored in a memory. The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The buffer controller 340 may write data in the buffer 360 or read data from the buffer 360. According to at least some example embodiments, the buffer 360 may be embodied in a volatile memory device, and the volatile memory device may be embodied in a buffer memory, a RAM, a SRAM, or a DRAM; however, it is not limited thereto.

The buffer 360 includes a first region which stores a first mapping table TABLE1 for a logical address-physical address conversion of a plurality of clusters 410, 430, . . . , 450, and a second region which can perform a function of a cache; however, it is not limited thereto.

For example, the first FTL (FTL1) executed by the CPU 330 and/or 331 may execute a logical address-physical address conversion using the first mapping table TABLE1 stored in the first region of the buffer 360. A logical address described in the present specification may be a logical block address (LBA) or a logical page address (e.g., logical page number (LPN)); however, it is not limited thereto.

According to at least one example embodiment of the inventive concepts, when each of the controller 310 and the buffer 360 is embodied in a semiconductor chip, the controller 310 and the buffer 360 may be embodied in one package, e.g., a package-on-package (PoP), a multi-chip package (MCP), or a system-in package (SiP); however, a type of the package is not limited thereto. For example, a first chip including the buffer 360 may be stacked above a second chip including the controller 310 through stack balls.

The PMIC 370 may control operational voltages supplied to the controller 310, the buffer 360, and/or the scale-out storage device cluster 400. For example, a first operational voltage supplied to the controller 310, a second operational voltage supplied to the buffer 360, and a third operational voltage supplied to the scale-out storage device cluster 400 may be the same as or different from each other.

The scale-out storage device cluster 400 may include a plurality of clusters 410, 430, . . . , 450. A first cluster 410 may be connected to a first main channel CHA, a second cluster 430 may be connected to a second main channel CHB, and a third cluster 450 may be connected to a third main channel CHC. Each of the plurality of clusters 410, 430, . . . , 450 may include at least one scale-out storage device to be described referring to FIG. 3.

A structure of each of the plurality of clusters 410, 430, . . . , 450 will be described in detail referring to FIGS. 2A to 7. The plurality of clusters 410, 430, . . . , 450 may be embodied substantially the same as or similar to each other in structure.

A main channel in the present specification may be an independent data path present between the controller 310, i.e., the third interface 350, and a corresponding cluster 410, 430, . . . or 450. The data path may include transmission lines for transmitting data and/or control signals.

A way may be a group of one or more non-volatile memory devices sharing one main channel. Accordingly, a plurality of ways may be connected to one main channel. The non-volatile memory device may be a die, a memory device, or a semiconductor package. For example, the controller 310 may control an A-channel*B-way. At this time, each of A and B may be a natural number of 1 or more. That is, a plurality of main channels may be connected between the controller 310 and the scale-out storage device cluster 400.

FIG. 2A is an example embodiment of a specific block diagram of the data storage device shown in FIG. 1, FIG. 2B is at least another example embodiment of the specific block diagram of the data storage device shown in FIG. 1, and FIG. 3 is a block diagram which shows an example embodiment of a first cluster shown in FIGS. 2A and 2B. A data storage device 300 shown in FIGS. 2A and 2B may be embodied in a data storage device having a scale-out structure.

Each of the clusters 410, 430, . . . , 450 may include at least one scale-out storage device (or multi-chip set). The first cluster 410 includes a plurality of scale-out storage devices 410-1 to 410-4, the second cluster 430 includes a plurality of scale-out storage devices 430-1 to 430-4, and the third cluster 450 includes a plurality of scale-out storage devices 450-1 to 450-4. The number of scale-out storage devices included in each of the clusters 410, 430, . . . , 450 may have be the same as or different from each other.

That is, the scale-out storage device may include a scale-out controller, a volatile memory, and at least one non-volatile memory (for example, a NAND-type flash memory device (NAND)).

Referring to FIGS. 1 to 3, it is assumed that the clusters 410 to 450 are substantially the same as each other in structure and operation. Therefore, a structure and an operation of the first cluster 410 will be representatively described. Referring to FIG. 3, the first cluster 410 may include a plurality of scale-out storage devices 410-1 to 410-4. Even if four scale-out storage devices 410-1 to 410-4 are shown in FIG. 3 as examples; however, a technical concept of the present inventive concepts is not limited to the number of the plurality of scale-out storage devices 410-1 to 410-4 included in the first cluster 410.

The first cluster 410 may include scale-out devices 410-1A, 410-2A, . . . , 410-4A and NAND-type flash memory devices NAND connected to each of the scale-out devices 410-1A, 410-2A, . . . , 410-4A.

A first scale-out storage device 410-1 may include a first scale-out device 410-1A and non-volatile memory devices NAND connected to the first scale-out device 410-1A. A second scale-out storage device 410-2 may include a second scale-out device 410-2A and non-volatile memory devices NAND connected to the second scale-out device 410-2A. A fourth scale-out storage device 410-4 may include a fourth scale-out device 410-4A and non-volatile memory devices NAND connected to the fourth scale-out device 410-4A.

Each of the scale-out devices 410-1A, 410-2A, ..., 410-4A may include each of scale-out controllers 411-1, 411-2, ..., 411-4 and each of volatile memory devices 413-1, 413-2, ..., 413-4. The scale-out controllers 411-1, 411-2, ..., 411-4 are substantially the same as or similar to each other in structure.

A first scale-out controller 411-1 may be connected to the first main channel CHA, channels CH11 to CH1m, where m is a natural number of two or more, and a first volatile memory device 413-1. Corresponding non-volatile memory devices NAND may be connected to each of the channels CH11 to CH1m. For example, each of the non-volatile memory devices NAND may be a NAND-type flash memory device or a managed NAND flash memory device; however, it is not limited thereto. Here, each channel may be an independent data path present between the first scale-out controller 411-1 and corresponding non-volatile memory devices NAND.

The first scale-out controller 411-1 may control an operation of each of the non-volatile memory devices NAND through each of the channels CH11 to CH1m. For example, the controller 310 may control an operation of the first scale-out controller 411-1 through the first main channel CHA.

The first volatile memory device 413-1 may include a first region for storing logical address-physical address mapping information (or mapping table) on the non-volatile memory devices NAND connected to each of the channels CH11 to CH1m. Moreover, the first volatile memory device 413-1 may further include a second region (or cache region) for temporarily storing data to be written in at least one of the non-volatile memory devices NAND connected to each of the channels CH11 to CH1m or data output from at least one of the non-volatile memory devices NAND connected to each of the channels CH11 to CH1m.

Figure 7:
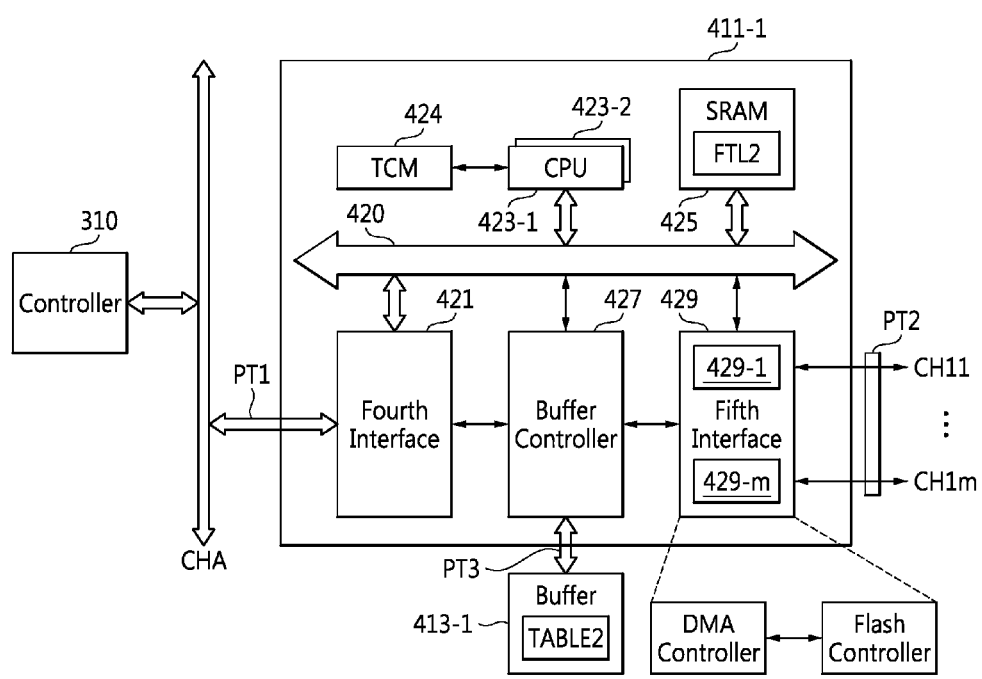
FIG. 7 is a block diagram of a first scale-out controller shown in FIG. 4.

For example, a second FTL executed by a CPU 423-1 or 423-2 included in the first scale-out controller 411-1 may execute a logical address-physical address conversion using a mapping table stored in a first region of the first volatile memory device 413-1 as shown in FIG. 7. The second FTL FTL2 may be loaded to an internal memory 425 from a non-volatile memory device included in the first cluster 410 and may be executed by the CPU 423-1 or 423-2.

A second scale-out controller 411-2 may be connected to the first main channel CHA, channels CH21 to CH2m, and a second volatile memory device 413-2. Corresponding non-volatile memory devices NAND may be connected to each of channels CH21 to CH2m.

The second scale-out controller 411-2 may control an operation of each of the non-volatile memory devices NAND through each of the channels CH21 to CH2m. For example, the controller 310 may control an operation of the second scale-out controller 411-2 through the main channel CHA.

The second volatile memory device 413-2 may include a first region for storing logical address-physical address mapping information (or mapping table) on the non-volatile memory devices NAND connected to each of the channels CH21 to CH2m. Moreover, the second volatile memory device 413-2 may further include a second region (or cache region) for temporarily storing data to be written in at least one of the non-volatile memory devices NAND connected to each of the channels CH21 to CH2m or data output from at least one of the non-volatile memory devices NAND connected to each of the channels CH21 to CH2m.

When the first scale-out controller 411-1 shown in FIG. 7 is the same as the second scale-out controller 411-2 in structure, a third FTL executed by the CPU 423-1 or 423-2 included in the second scale-out controller 411-2 may execute a logical address-physical address conversion using the mapping table stored in the first region of the second volatile memory device 413-2. The third FTL may be loaded to the internal memory 425 from the non-volatile memory device included in the first cluster 410 and executed by the CPU 423-1 or 423-2.

A fourth scale-out controller 411-4 may be connected to the first main channel CHA, channels CH41 to CH4m, and a fourth volatile memory device 413-4. Corresponding non-volatile memory devices NAND may be connected to each of the channels CH41 to CH4m.

The fourth scale-out controller 411-4 may control an operation of each of the non-volatile memory devices NAND through each of the channels CH41 to CH4m. For example, the controller 310 may control an operation of the fourth scale-out controller 411-4 through the main channel CHA.

The fourth volatile memory device 413-4 may include a first region for storing logical address-physical address mapping information (or mapping table) on corresponding non-volatile memory devices NAND connected to each of the channels CH41 to CH4m. Moreover, the fourth volatile memory device 413-4 may further include a second region (or cache region) for temporarily storing data to be written in at least one of the corresponding non-volatile memory devices NAND connected to each of the channels CH41 to CH4m or data output from at least one of the corresponding non-volatile memory devices NAND connected to each of the channels CH41 to CH4m.

When the first scale-out controller 411 shown in FIG. 7 is the same as the fourth scale-out controller 411-4 in structure, a fifth FTL executed by the CPU 423-1 or 423-2 included in the fourth scale-out controller 411-4 may execute a logical address-physical address conversion using the mapping table stored in the first region of the fourth volatile memory device 413-4. The fifth FTL may be loaded to the internal memory 425 from the non-volatile memory device included in the first cluster 410 and may be executed by the CPU 423-1 or 423-2.

Each of the volatile memory devices 413-1 to 413-4 may be a buffer or a buffer memory, and may be embodied in a RAM, a SRAM, or a DRAM; however, it is not limited thereto.

Even if it is shown that each of the scale-out storage devices 410-1 to 410-4 includes the same number of channels (for example, m) in FIG. 3; however, the number of channels included in each of the scale-out storage devices 410-1 to 410-4 may be different from each other According to at least some example embodiments.

Figure 4:
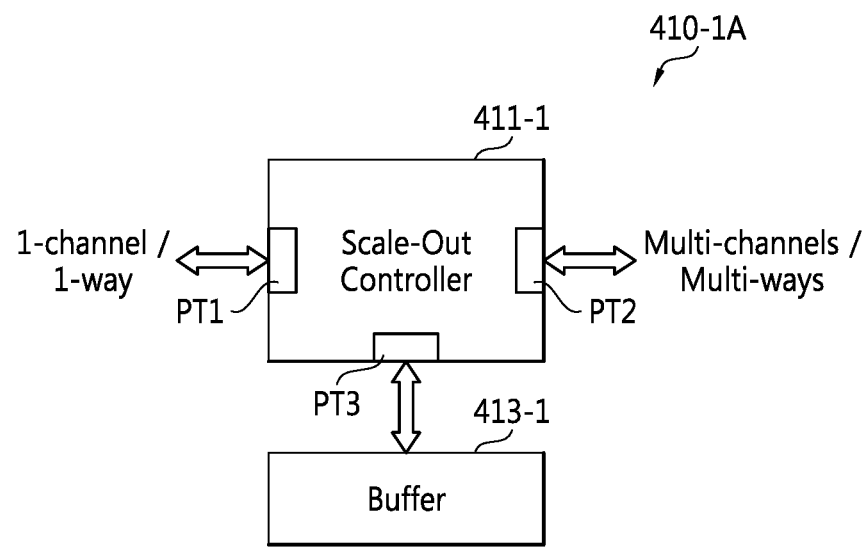
FIG. 4 is a schematic diagram of a first scale-out device shown in FIG. 3.

FIG. 4 is a schematic diagram of a first scale-out device shown in FIG. 3, and FIG. 7 is a block diagram of a first scale-out controller shown in FIG. 4. Referring to FIGS. 1 to 5, and 7, since the scale-out controllers 411-1 to 411-4 are substantially the same as or similar to each other in structure and operation, a structure and an operation of the first scale-out controller 411-1 will be representatively described herein.

The first scale-out controller 411-1 may control transmission of a command and/or data transmitted or received between the controller 310, the first volatile memory device 413-1, and the non-volatile memory devices NAND included in the first scale-out storage device 410-1. According to at least some example embodiments, the first scale-out controller 411-1 may be embodied in an IC, a chip set, or a SoC.

Referring to FIG. 7, the first scale-out controller 411-1 may include a bus architecture 420, a fourth interface 421, at least one CPU 423-1 and/or 423-2, a TCM 424, the internal memory 425, a buffer controller 427, and a fifth interface 429. The bus architecture 420 may be embodied in AMBA, AHB, APB, AXI, ASB, ACE, or a combination of these; however, it is not limited thereto.

The fourth interface 421 may change a format of a response and/or data to be transmitted to the controller 310 and transmit the response having a changed format and/or the data having a changed format to the controller 310 through the first main channel CHA. Moreover, the fourth interface 421 may receive a command and/or data transmitted from the controller 310, change a format of a received command and/or received data, and transmit the command having a changed format and/or the data having a changed format to at least one CPU 423-1 and/or 423-2, and/or to the buffer controller 427. According to at least one example embodiment of the inventive concepts, the fourth interface 421 may include a transceiver for transmitting and/or receiving a signal and/or data.

A structure and an operation of the fourth interface 421 may be embodied to be compatible with the structure and the operation of the third interface 350. For example, the fourth interface 421 may be embodied in a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto.

According to at least one example embodiment of the inventive concepts, referring to FIGS. 4 and 7, the fourth interface 421 may be connected to one channel (or one main channel) or one way. First terminals PT1 are terminals for connecting the first main channel CHA and the fourth interface 421, third terminals PT3 are terminals for connecting the first volatile memory device 413-1 and the buffer controller 427, and second terminals PT2 are terminals for connecting the fifth interface 429 and one or more channels CH11 to CH1m. The terminals may be pins or pads.

One or more CPUs 423-1 and/or 423-2 may control the fourth interface 421, the internal memory 425, the buffer controller 427, and the fifth interface 429 through the bus architecture 420. Each of the CPUs 423-1 and/or 423-2 may include one or more cores.

For example, a first CPU 423-1 may transmit or receive a command and/or data to or from the third interface 350 through the first main channel CHA and the fourth interface 421, and a second CPU 423-2 may transmit or receive a command and/or data to or from at least one of the non-volatile memory devices NAND connected to each of the channels CH11 to CH1m through the fifth interface 429. According to at least one example embodiment of the inventive concepts, the first CPU 423-1 and the second CPU 423-2 may configure a multi-CPU. According to at least one example embodiment of the inventive concepts, the first CPU 423-1 may control the second CPU 423-2; however, it is not limited thereto.

The internal memory 425 may store data necessary for an operation of a first scale-out controller 415-1 or data generated by a data processing operation (for example, a write operation or a read operation) performed by the first scale-out controller 415-1. For example, the internal memory 425 may store a second flash translation layer (FTL2) which can be executed by the CPU 423-1 and/or 423-2. For example, when a data storage device 300 is booted, the second FTL (FTL2) may be loaded to the internal memory 425 from a non-volatile memory included in the scale-out storage device cluster 400. According to at least some example embodiments, the internal memory 425 may be embodied in a RAM, a DRAM, a SRAM, a buffer, a buffer memory, or a cache; however, it is not limited thereto.

The buffer controller 427 may write data in the first volatile memory device 413-1 or read data from the first volatile memory device 413-1 according to a control of the first CPU 423-1 or the second CPU 423-2. The buffer controller 427 may be referred to as a controller or a buffer manager which can control a write operation and a read operation for the first volatile memory device 413-1.

The fifth interface 429 may control data processing operations for the non-volatile memory devices NAND through a corresponding channel among a plurality of channels CH11 to CH1m according to a control of the first CPU 423-1 or the second CPU 423-2.

Referring to FIGS. 4 and 7, a plurality of channels and/or a plurality of ways may be connected to the fifth interface 429. According to at least some example embodiments, the fifth interface 429 may be embodied in, for example, a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto.

For example, the fifth interface 429 may include each of memory controllers 429-1 to 429-$m$ corresponding to each of the channels CH11 to CH1m. For example, when each of the non-volatile memory devices NAND is a NAND-type flash memory, each of the memory controllers 429-1 to 429-$m$ may include a flash memory controller. Moreover, each of the memory controllers 429-1 to 429-$m$ may include a DMA controller and a flash controller (e.g., NAND flash memory controller).

The volatile memory device 413-1 may include a first region for storing a mapping table for a logical address-physical address conversion of the non-volatile memory devices NAND included in the first scale-out storage device 410-1 and a second region which can perform a function of cache; however, a least some example embodiments of the inventive concepts are not limited thereto. For example, the second FTL FTL2 executed by the CPU 423-1 and/or 423-2 may execute a logical address-physical address conversion using the mapping table stored in the first region.

When at least one of the non-volatile memory devices NAND described referring to FIG. 3 is replaced with a scale-out storage device (e.g., scale-out storage device such as 410-1), scalability in memory capacity of the scale-out storage device cluster 400 may be increased.

Figure 5:
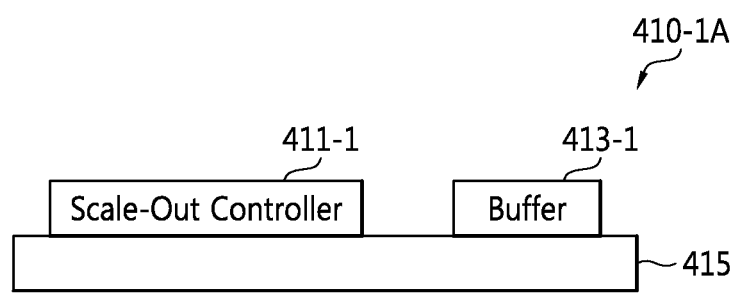
FIG. 5 is an example embodiment of a semiconductor package of the first scale-out device shown in FIG. 4.

FIG. 5 is an example embodiment of a semiconductor package of the first scale-out device shown in FIG. 4. Referring to FIGS. 3 to 5, the first scale-out device 410-1A may be embodied in a semiconductor package. That is, the first scale-out device 410-1A may include the first scale-out controller 411-1 and the first volatile memory device 413-1 each attached or mounted on a semiconductor substrate 415.

For example, the first scale-out controller 411-1 may be attached or mounted on the semiconductor substrate 415 in a flip-chip structure. Moreover, when the first scale-out controller 411-1 is attached or mounted on the semiconductor substrate 415 through an adhesive material, the first scale-out controller 411-1 may transmit or receive electrical signals to or from the semiconductor substrate 415 through bonding wires.

For example, the first volatile memory device 413-1 may be attached or mounted on the semiconductor substrate 415 in a flip-chip structure. Moreover, when the first volatile memory device 413-1 is attached or mounted on the semiconductor substrate 415 through an adhesive material, the first volatile memory device 413-1 may transmit or receive electrical signals to or from the semiconductor substrate 415 through bonding wires. That is, the first scale-out controller 411-1 may transmit or receive a command and/or data to or from the first volatile memory device 413-1 through the semiconductor substrate 415. Semiconductor packages for the scale-out devices 410-1A to 410-4A are substantially the same as or similar to each other.

Figure 6:
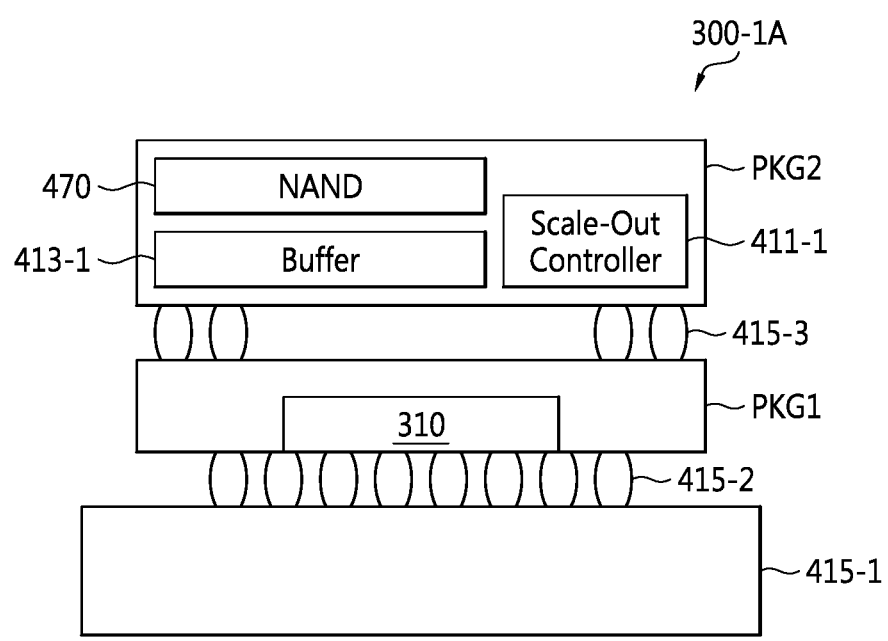
FIG. 6 is an example embodiment of a semiconductor package which includes a controller and a first scale-out storage device shown in FIG. 1.

FIG. 6 illustrates an example embodiment of a semiconductor package which includes the controller and the first scale-out storage device shown in FIG. 1. A semiconductor package 300-1A shown in FIG. 6 may be embodied in an embedded package on package (ePOP); however, a type of the semiconductor package 300-1A is not limited thereto.

For example, the semiconductor package 300-1A may include a semiconductor substrate 415-1, a first package PKG1 disposed over the semiconductor substrate 415-1, and a second package PKG2 disposed over the first package PKG1. The first package PKG1 may be attached or mounted on the semiconductor substrate 415-1 through first bumps 415-2, and transmit or receive electrical signals to or from the semiconductor substrate 415-1 through the first bumps 415-2. The second package PKG2 may be attached or mounted on the first package PKG1 through second bumps 415-3, and transmit or receive electrical signals to or from the semiconductor substrate 415-1 through the second bumps 415-3.

The first package PKG1 may include the controller 310. The second package PKG2 may include the first scale-out controller 411-1, the first volatile memory device 413-1, and at least one NAND-type flash memory 470. For example, when each of the scale-out storage devices 410-2, . . . , 410-4 is embodied in each package and is attached or mounted on the semiconductor substrate 415-1, the controller 310 may control each of the scale-out storage devices 410-2, . . . , 410-4 through the semiconductor substrate 415-1.

Figure 8:
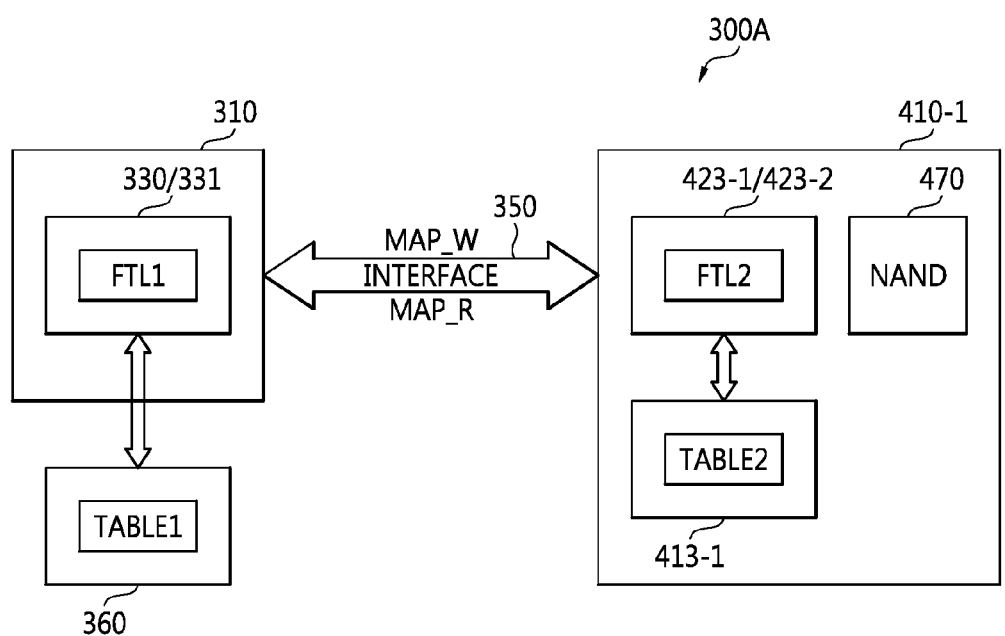
FIG. 8 is a conceptual diagram which describes an example embodiment of a dispersed FTL structure used in the data storage device shown in FIG. 1.

FIG. 8 is a conceptual diagram which describes an example embodiment of a dispersed FTL structure used in the data storage device shown in FIG. 1. Referring to FIGS. 1 to 8, a data storage device 300A may include the controller 310 and the first scale-out storage device 410-1.

In the data storage device 300A, a buffer may be classified into the buffer 360 connected to the controller 310 and a buffer 413-1 connected to the scale-out controller 411-1. At this time, each of the buffers 360 and 413-1 may be used to disperse a logical-to-physical mapping table.

For example, as the number of scale-out storage devices included in the data storage device 300A is increased, a size (or volume) of the logical-to-physical mapping table is increased. Accordingly, when the logical-to-physical mapping table cannot be stored in the buffer 360 connected to the controller 310, the data storage device 300A divides the logical-to-physical mapping table into a plurality of parts, and stores each of divided parts in a buffer included in each of scale-out storage devices.

The logical-to-physical mapping table TABLE1 stored in the buffer 360 may include at least a portion of a logical-to-physical mapping table for an entire data storage device 300A. The first FTL (FTL1) executed by the CPU 330 and/or 331 may manage the logical-to-physical mapping table TABLE1. A logical-to-physical mapping table TABLE2 stored in the buffer 413-1 may be a mapping table for the non-volatile memory devices NAND included in the first scale-out storage device 410-1. The second FTL FTL2 executed by the CPU 423-1 and/or 423-2 may manage the logical-to-physical mapping table TABLE2.

According to at least one example embodiment of the inventive concepts, a type of the logical-to-physical mapping table TABLE1 stored in the buffer 360 may be different from a type of the logical-to-physical mapping table TABLE2 stored in the buffer 413-1. For example, the logical-to-physical mapping table TABLE1 may be a table for logical address-to-physical address mapping, and the logical-to-physical mapping table TABLE1 may be a table for wear-leveling.

Even if an example embodiment in which one logical-to-physical mapping table is divided into two logical-to-physical mapping tables TABLE1 and TABLE2 and each of divided logical-to-physical mapping table TABLE1 and TABLE2 is stored in different buffers 360 and 413-1 is shown in FIG. 8, but one logical-to-physical mapping table may be divided into three or more logical-to-physical mapping tables and each of divided logical-to-physical mapping tables may be stored in a buffer included in each scale-out storage device. For example, one logical-to-physical mapping table may be divided into logical-to-physical mapping tables having the same size or different sizes.

The controller 310 and the first scale-out storage device 410-1 may perform a map write operation or a map read operation for the logical-to-physical mapping table TABLE2 through the interface 350. The second FTL FTL2 may control an update operation for the logical-to-physical mapping table TABLE2. The first FTL FTL1 may control an update operation for the logical-to-physical mapping table TABLE1.

Figure 9:
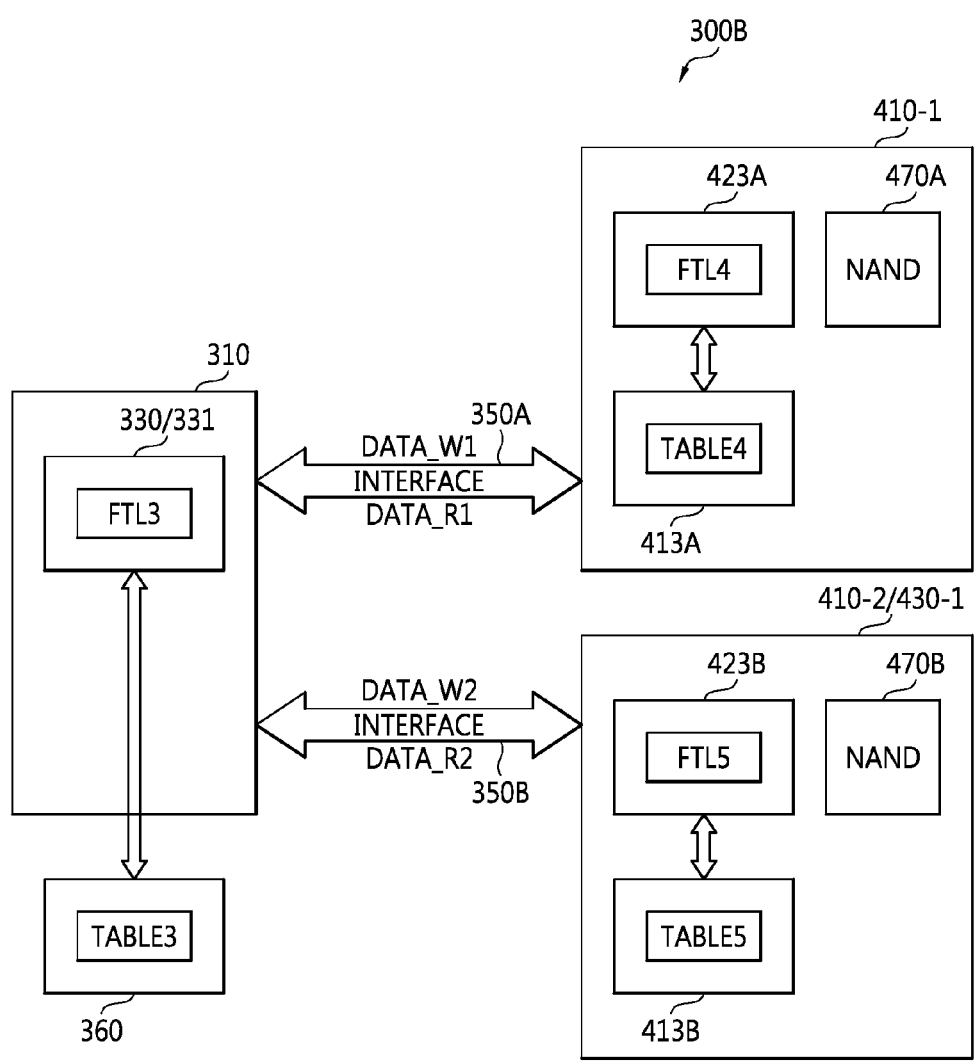
FIG. 9 is a conceptual diagram which describes at least another example embodiment of the dispersed FTL structure used in the data storage device shown in FIG. 1.

FIG. 9 is a conceptual diagram which describes at least another example embodiment of the dispersed FTL structure used in the data storage device shown in FIG. 1. Referring to FIGS. 1 to 7, and 9, a data storage device 300B may include the controller 310, the first scale-out storage device 410-1, and the second scale-out storage device 410-2 or 430-1.

A logical-to-physical mapping table TABLE4 stored in a buffer 413A may be a mapping table for non-volatile memory devices 470A included in the first scale-out storage device 410-1. Moreover, a logical-to-physical mapping table TABLE5 stored in a buffer 413B may be a mapping table for non-volatile memory devices 470B included in the second scale-out storage device 410-2 or 430-1. That is, the logical-to-physical mapping tables TABLE4 and TABLE5 for an entire data storage device 300A may be stored in the scale-out storage devices 410-1, and 410-2 or 430-1 only.

The controller 310 may transmit data DATA_W1 to the first scale-out storage device 410-1 through an interface 350A, and receive data DATA_R1 from the first scale-out storage device 410-1 through the interface 350A. A fourth FTL FTL4 executed by a CPU 423A of the first scale-out storage device 410-1 may execute logical address-to-physical address conversion using the logical-to-physical mapping table TABLE4 stored in the buffer 413A, and execute an update operation on the logical-to-physical mapping table TABLE4. At this time, the CPU 423A may be the CPU 423-1 and/or 423-2, and the buffer 413A may be the buffer 413-1.

The controller 310 may transmit data DATA_W2 to the second scale-out storage device 410-2 or 430-1 through an interface 350B and receive data DATA_R2 from the second scale-out storage device 410-2 or 430-1 through the interface 350B. A fifth FTL FTL5 executed by the CPU 423B of the second scale-out storage device 410-2 or 430-1 may execute logical address-to-physical address conversion using the logical-to-physical mapping table TABLE5 stored in the buffer 413B, and execute an update operation on the logical-to-physical mapping table TABLE5.

The buffer 360 connected to the controller 310 may store a third table TABLE3. For example, the third table TABLE3 may be used to cache the logical-to-physical mapping table TABLE4 and/or TABLE5.

As shown in FIGS. 1, 8, and 9, when the host 200 accesses the table TABLE2, TABLE4, or TABLE5, the controller 310 may access the table TABLE2, TABLE4, or TABLE5 through the interface 350, 350A, or 350B. That is, the controller 310 may read, write, or update the table TABLE2, TABLE4, or TABLE5 through the interface 350, 350A, or 350B. For example, each of the interfaces 350A and 350B may be a portion of the interface 350.

FIG. 10A is a command protocol of the related art, and FIG. 10B is a conceptual diagram of a new command protocol according to at least one example embodiment of the inventive concepts.

Referring to FIG. 10A, when a command of the related art is a write command, a controller transmits a write command sequence CMD_PRE to a NAND flash memory. A first command CMD1 instructs a transmission start of addresses CA1, CA2, RA1, RA2, and RA3 and a second command CMD2 instructs a transmission completion of the addresses CA1, CA2, RA1, RA2, and RA3.

That is, the addresses CA1, CA2, RA1, RA2, and RA3 are transmitted in five address cycles. Here, CA1 and CA2 are column addresses, and RA1, RA2, and RA3 are row addresses. A third command CMD3 instructs a transmission start of write data WDATA and a fourth command CMD4 instructs a transmission completion of the write data WDATA.

Referring to FIG. 10B, a new command sequence CMD_PI according to at least one example embodiment of the inventive concepts may include commands CMDa, PCMD, and CMDb. A first command CMDa may instruct a transmission start of a command PCMD, and a second command CMDb may instruct a transmission completion of the command PCMD.

The command PCMD may include a command index CMD_IDX necessary for command queuing, a flag FLAG which represents an attribute of the command PCMD, detailed information on the command PCMD, that is, command information CMD_INF including command data, and parity data PARITY which ensures data integrity for the command PCMD. For example, the command PCMD may be transmitted in address cycles.

The flag FLAG may include a first bit FLAG1. When a scale-out storage device receives the command PCMD including the first bit FLAG1, the scale-out storage device may determine whether or not an interrupt occurs, for example, based on the value of the first bit FLAG1. The flag FLAG may include a second bit FLAG2. When a scale-out storage device receives a command PCMD including the second bit FLAG2, the scale-out storage device may determine a processing sequence of the command PCMD, for example, based on the value of the second bit FLAG2.

The flag FLAG may include a third bit FLAG3. When a scale-out storage device receives a command PCMD including the third bit FLAG3, the scale-out storage device may determine whether to process the command PCMD synchronously or asynchronously, for example, based on the value of the third bit FLAG3.

The flag FLAG may include a fourth bit FLAG4. When a scale-out storage device receives a command PCMD including the fourth bit FLAG4, the scale-out storage device may determine whether the command PCMD is a logical command or a physical command, for example, based on the value of the fourth bit FLAG4. A command parser 421-2 to be descried referring to FIGS. 14 and 15 may determine whether a received command PCMD is a logical command or a physical command referring to the fourth bit FLAG4. That is, a scale-out storage device may process one of a logical command and a physical command. For example, the logical command may include a logical address, and the logical address may be a logical block address (LBA), a logical page address (LPN), or a sector bitmap; however, it is not limited thereto.

The flag FLAG may include a fifth bit FLAG5. When a scale-out storage device receives a command PCMD including the fifth bit FLAG5, the scale-out storage device may determine whether or not to perform a parity check on received data, for example, based on the value of the fifth bit FLAG5.

The flag FLAG may include a sixth bit FLAG6. When a scale-out storage device receives a command PCMD including the sixth bit FLAG6, the scale-out storage device may determine whether or not to encrypt received data using an encryption engine, for example, based on the value of the sixth bit FLAG6. For example, the encryption engine may be an advanced encryption standard (AES) engine; however, it is not limited thereto.

The flag FLAG may include a seventh bit FLAG7. When a scale-out storage device receives a command PCMD including the seventh bit FLAG7, the scale-out storage device may determine whether or not to include a spare region in data (for example, write data or read data) to be processed, for example, based on the value of the seventh bit FLAG7.

Figure 32:
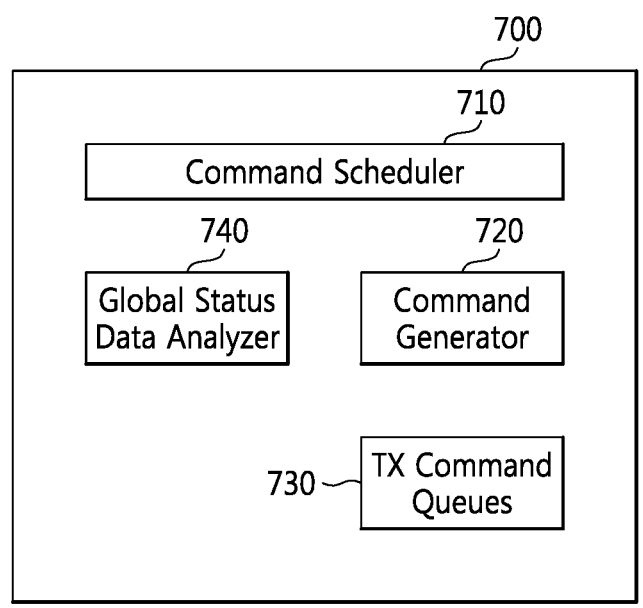
FIG. 32 is a block diagram which schematically shows a processing module generating a command protocol and a global state read command according to at least one example embodiment of the inventive concepts.

For example, a command generator 720 of FIG. 32 may generate a write command sequence CMD_PI shown, as an example, in (B) of FIG. 10. The command generator 720 may generate a flag FLAG including at least one of the first bit FLAG 1 to the seventh bit FLAG7.

When the command sequence CMD_PI is a write command sequence (hereinafter, simply referred to as "write command"), the controller 310 may sequentially transmit a third command CMDc, write data WDATA, parity data PDATA, and a fourth command CMDd to a scale-out storage device through the interface 350. For example, the third command CMDc instructs a transmission start of the write data WDATA, and the parity data are data for data integrity of the write data WDATA, and the fourth command CMDd instructs a transmission completion of the parity data PDATA.

FIG. 11 shows at least some example embodiments of a command type and a parameter type, which are included in command information shown in FIG. 10B Referring to FIGS. 10B and 11, command information CMD_INF may include command data. For example, the command data may include a command type and a parameter (or parameter type) of the command type The command type may include at least one of a write command, a read command, a map write command, a map read command, a flush command, a sanitize command, a trim command, and a device information command.

For example, the write command or the read command may be a command related to transmission of user data. For example, the map write command or the map read command may be a command related to transmission of non-user data. For example, the flush command, the sanitize command, the trim command, or the device information command may be a command related to transmission of data of a small size which do not result in a transfer of the user data (such data is referred to, hereinafter, as "non-data").

For example, the map write command may be a command related to a write of the logical-to-physical mapping table (TABLE2. TABLE4, or TABLE5), and the map read command may be a command related to a read of the logical-to-physical mapping table TABLE2, TABLE4, or TABLE5.

A volume type may be information on memory regions having different attributes. For example, the volume type may be information on a memory region in which user data are to be stored or information on a memory region in which metadata are to be stored. Moreover, the volume type may be information on a memory region in which data are to be stored in an SLC method or information on a memory region in which data are to be stored in an MLC method; however, it is not limited thereto.

A sector bitmap may include positional information on valid sectors.

When the command sequence CMD_PI is a read command sequence (hereinafter, simply referred to as "read command") for reading user data, the command PCMD may include a command index CMD_IDX necessary for command queuing, a flag FLAG which shows an attribute of the command PCMD, detailed information on the command PCMD, that is, command information CMD_INF including command data, and parity data PARITY which ensures data integrity for the command PCMD. For example, the command PCMD may be transmitted in address cycles.

After transmitting a read command to a scale-out storage device, the controller 310 may check that data related to the read command are ready by the scale-out storage device, and read read data and parity data for the read data from the scale-out storage device according to a result of the check.

Figure 12:
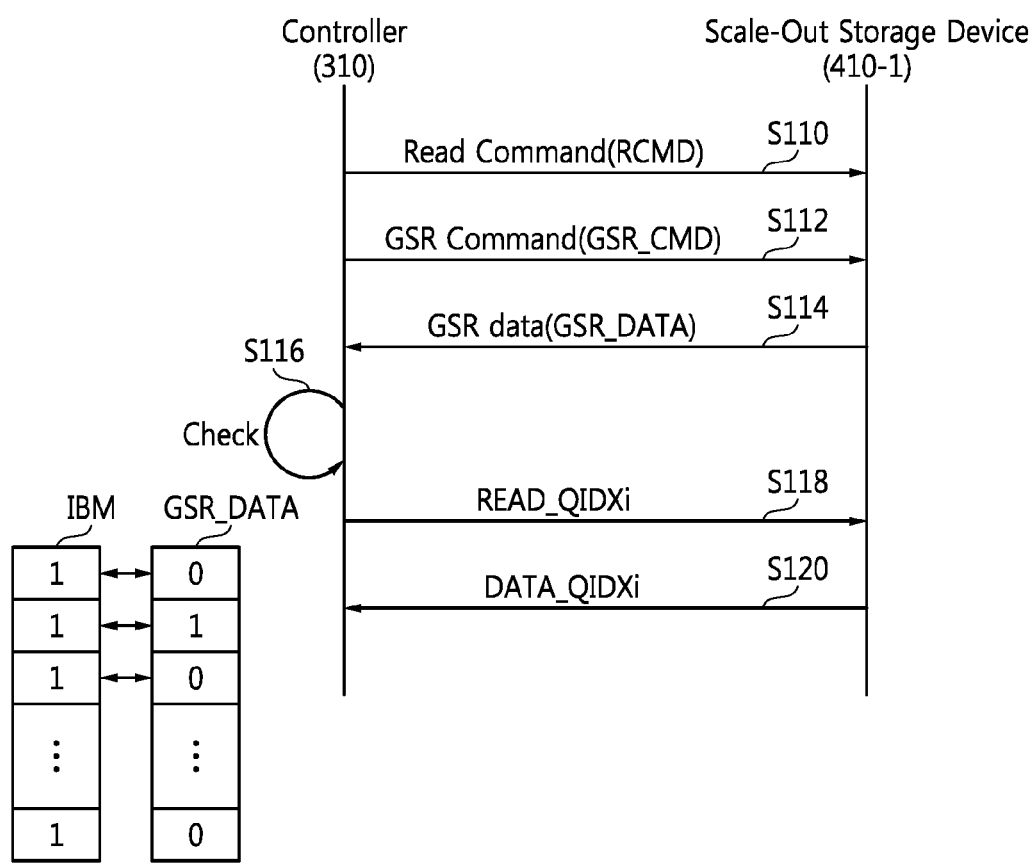
FIG. 12 is a data flowchart which describes a read operation of the data storage device shown in FIG. 1.

FIG. 12 is a data flowchart which describes a read operation of the data storage device shown in FIG. 1. A read operation of the data storage device 300 will be described referring to FIGS. 1 to 12. The controller 310 may transmit a first read command RCMD including a command index CMD_IDX to the first scale-out storage device 410-1 through the interface 350 (S110). The first scale-out storage device 410-1 may read data related to the first read command RCMD from a non-volatile memory device in response to the first read command RCMD.

The controller 310 may transmit a global state read command GSR_CMD to the first scale-out storage device 410-1 through the interface 350 (S112). The first scale-out storage device 410-1 may transmit global state data GSR_DATA to the controller 310 through the interface 350 in response to the global state read command GSR_CMD (S114). The global state data GSR_DATA may include a state bit for each of command queued in the first scale-out storage device 410-1. For example, the global state data GSR_DATA may include a state bit which shows whether or not a read operation for each of the queued commands is completed.

The controller 310 may check whether or not a read operation related to a first read command RCMD is completed using state bits included in the global state data GSR_DATA (S116). For example, the controller 310 may compare bits included in a bit map IBM for issued commands with state bits included in the global state data GSR_DATA, and transmit a second read command READ_QIDXi to the first scale-out storage device 410-1 through the interface 350 according to a result of the comparison (S118).

For example, when a command index corresponding to a bit having logic 1 among the state bits included in the global state data GSR_DATA is present and a read operation for a read command including the command index is assumed to be completed, the controller 310 may transmit a second read command READ_QIDXi including a command index corresponding to the bit having logic 1 to the first scale-out storage device 410-1 through the interface 350 (S118). Accordingly, the first scale-out storage device 410-1 may transmit data related to a second read command READ_Q-IDXi including a command index corresponding to the bit having logic 1 to the controller 310 as read data DATA_Q-IDXi (S120).

When the command sequence CMD_PI is a command related to transmission of non-data, the controller 310 may transmit a command PCMD including only the command information CMD_INF shown in FIG. 10B to the first scale-out storage device 410-1 through the interface 350.

For example, when a command type is a flush, a sanitize, a secure erase, a trim, a power mode, or a vendor command, the controller 310 may transmit only non-data of a small size, which do not require transmission of user data, to the scale-out storage device 410-1 through the interface 350. For example, when a size of user data is assumed to be 1 Kbyte or more, a size of the non-data may be 32 Bytes; however, it is not limited thereto.

FIG. 13 is a conceptual diagram which describes a structure and an operation of a fourth interface in FIG. 7. Referring to FIGS. 1 to 13, a host interface module 421 according to at least one example embodiment of the inventive concepts may be embodied in a hardware component. Description on a host interface module 421S embodied in a software component will be described in detail referring to FIG. 31.

The fourth interface 421, that is, the host interface module 421, may process the command PCMD described referring to FIG. 10B. As described above, the command PCMD according to an example embodiment may include a command index CMD_IDX necessary for command queuing, a flag FLAG which shows an attribute of the command PCMD, detailed information on the command PCMD, that is, command information CMD_INF including command data, and parity data PARITY which ensures data integrity of the command PCMD. According to at least one example embodiment of the inventive concepts, the command PCMD may include detailed information on the command PCMD only, that is, command information CMD_INF including command data.

The host interface module 421 may include a command manager 421-1, a command parser 421-2, a command logger 421-3, and a DMA manager 421-4. It is assumed that a command slot 510, state data registers 520, . . . , 521, and a command descriptor pool 530 are stored in a memory included in the first scale-out storage device 410-1.

It is assumed that the memory is the TCM 424 which can be accessed by a CPU 423-1 and/or 423-2 (collectively "423-1"), the internal memory 425, the buffer 413-1, or the non-volatile memory NAND. In addition, the command slot 510, the state data registers 520, . . . , 521, and the command descriptor pool 530 may be stored in one of the memories 424, 425, 413-1, and NAND or in different memories.

The command manager 421-1 allocates the command PCMD including the command index CMD_IDX to one of a plurality of slots included in the command slot 510 and allocates a valid command descriptor among a plurality of command descriptors included in the command descriptor pool 530 to a command descriptor for storing the command PCMD. The command manager 421-1 may store the command PCMD in an allocated slot and in an allocated command descriptor. Here, the slot is a memory region for storing the command PCMD, and the command descriptor is a command descriptor buffer for storing the command PCMD.

The command manager 421-1 may ensure a transmission error E2E for the command PCMD based on parity data included in the command PCMD. Here, the transmission error E2E may be an error occurring in a procedure in which the command PCMD is transmitted through the interface 350. The command manager 421-1 may determine whether or not the transmission error E2E for the command PCMD occurs, and store an instruction bit according to a result of the determination in a transmission error state data register 521. The command manager 421-1 may transmit global state data including state bits stored in the transmission error state data register 521 to the controller 310 based on a global state read command transmitted from the controller 310.

Referring to FIG. 13, the command parser 421-2 may parse the command PCMD, determine whether a parsed command is a physical command or a logical command, and transmit the parsed command to a fifth interface (for example, a flash memory controller) 429 or the CPU 423-1 and/or 423-2 according to a result of the determination.

Figure 14:
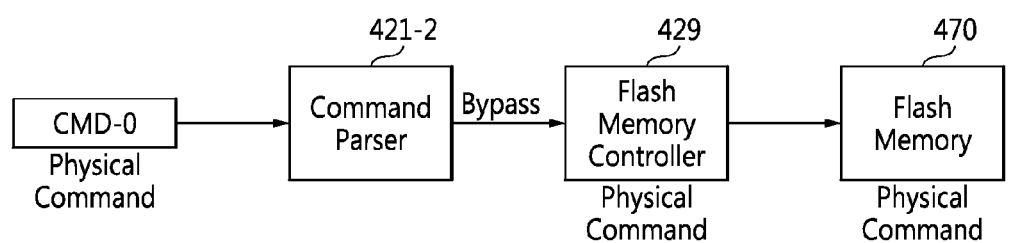
FIG. 14 is a conceptual diagram which describes an operation of a command parser shown in FIG. 13 processing a physical command.

FIG. 14 is a conceptual diagram which describes an operation of a command parser shown in FIG. 13 processing a physical command. Referring to FIGS. 13 and 14, when a command PCMD=CMD-0 is a physical command, the command parser 421-2 may transmit a parsed command to the fifth interface (for example, a flash memory controller). That is, the parsed command may be bypassed to the fifth interface (e.g., flash memory controller) 429. The fifth interface (e.g., flash memory controller) may access the non-volatile memory device NAND using a physical command.

Figure 15:
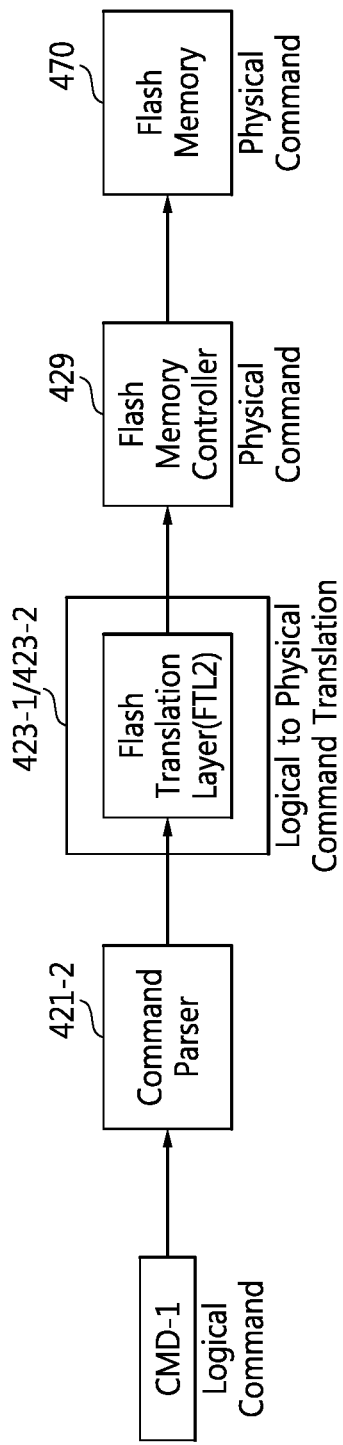
FIG. 15 is a conceptual diagram which describes the operation of the command parser shown in FIG. 13 processing a logical command.

FIG. 15 is a conceptual diagram which describes an operation of the command parser shown in FIG. 13 processing a logical command. Referring to FIGS. 13 and 15, when a command PCMD=CMD-1 is a logical command, the command parser 421-2 may transmit a parsed command to the CPU 423-1 and/or 423-2. The second FTL FTL2 executed by the CPU 423-1 and/or 423-2 may execute a logical-physical command conversion which converts a logical command into a physical command, and transmit the physical command to the fifth interface (e.g., flash memory controller) 429. The fifth interface (e.g., flash memory controller) 429 may access the non-volatile memory device NAND using the physical command.

Moreover, the command parser 421-2 may perform an operation corresponding to at least one bit (FLAG1 to FLAG7) included in a flag FLAG based on the flag FLAG included in a parsed logical command. The command parser 421-2 may transmit command information CMD_INF included in a logical command PCMD including a logical address (e.g., LBA or LPN) to the second FTL FTL2 according to a result of the parsing.

Figure 16:
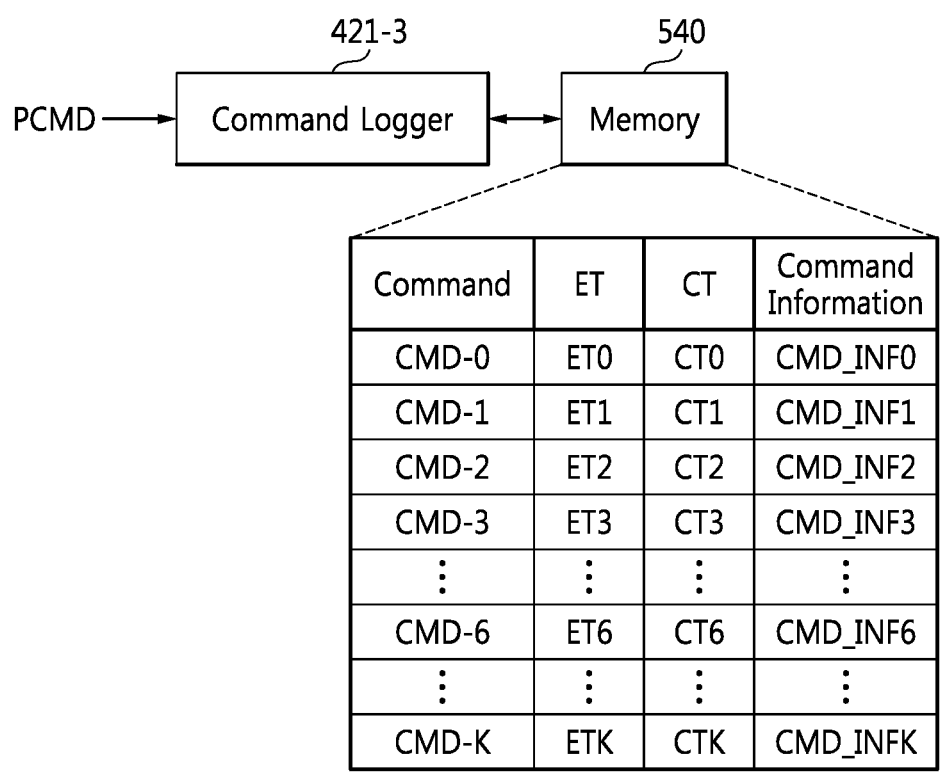
FIG. 16 is a conceptual diagram which describes an operation of a command logger shown in FIG. 13.

FIG. 16 is a conceptual diagram which describes an operation of a command logger shown in FIG. 13. Referring to FIGS. 13 and 16, a command logger 421-3 may log a reception time ET0 to ETk of each of commands CMD-0 to CMD-k, where k is a natural number of seven or more, and a completion time CT0 to CTk of an operation corresponding to each of the commands CMD-0 to CMD-k.

For example, the command logger 421-3 may record a time stamp for the reception time ET and the completion time CT. Moreover, the command logger 421-3 may store at least a portion of the command information CMD_INF included in each of the commands CMD-0 to CMD-k in a memory 540. The memory 540 may be the TCM 424, the internal memory 425, the buffer 413-1, or the non-volatile memory device NAND.

Figure 17:
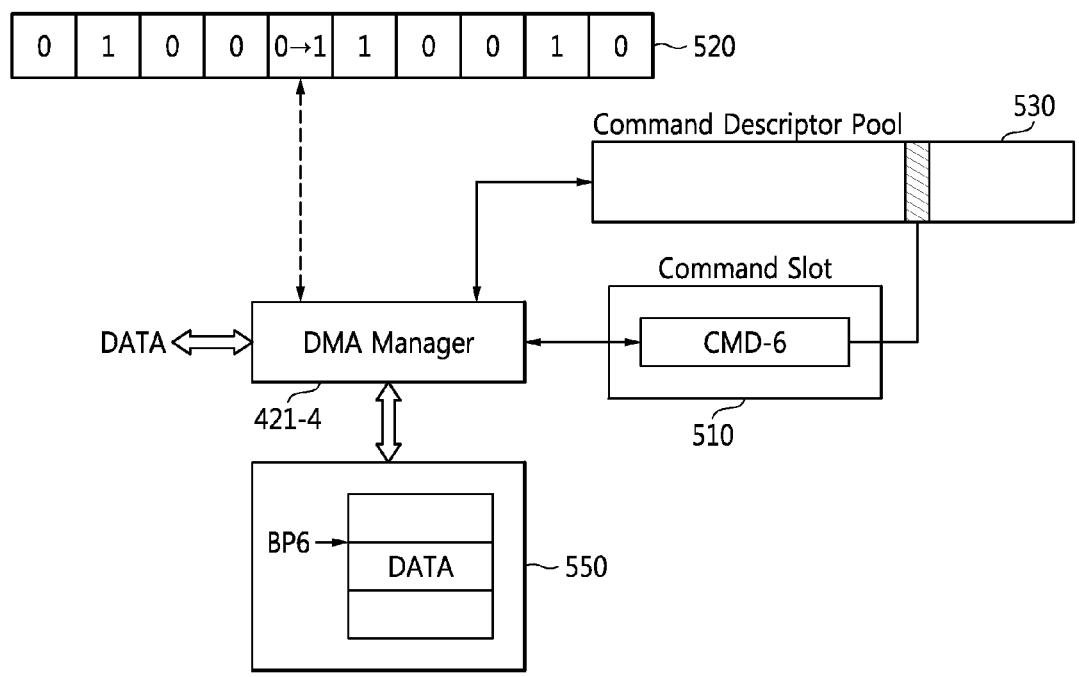
FIG. 17 is a conceptual diagram which describes an operation of a direct memory access (DMA) manager shown in FIG. 13.

FIG. 17 is a conceptual diagram which describes an operation of a direct memory access (DMA) manager shown in FIG. 13. Referring to FIGS. 13 and 17, a data DMA may be generated through the interface 350 according to a write command or a read command. A DMA-In may be a procedure of writing data output from the controller 310 in the non-volatile memory device NAND according to a write command, and DMA-Out may be a procedure of transmitting data to the controller 310 from the non-volatile memory device NAND according to a read command.

The DMA manager 421-4 may perform an operation of allocating and releasing a buffer (for example, DRAM or SRAM) 550 according to a write operation related to a write command or a read operation related to a read command.

The command manager 421-1 may allocate a command PCMD=CMD-6 to a seventh slot corresponding to a command index CMD-IDX included in the command PCMD=CMD-6 among slots included in a command slot 510, and allocate a valid command descriptor among command descriptors included in the command descriptor pool 530 as a seventh command descriptor for storing the command PCMD=CMD-6.

When the command PCMD is a command accessing the buffer (e.g., DRAM or SRAM) 550, the DMA manager 421-4 may read the command information CMD-INF from the seventh command descriptor referring to the command information CMD_INF stored in the seventh slot, and access a memory region of the buffer (e.g., DRAM or SRAM) 550 using a memory pointer BP6 included in read command information CMD_INF.

That is, when the command PCMD is a write command, the DMA manager 421-4 may write write data DATA related to the write command PCMD=CMD-6 in the buffer (e.g., DRAM or SRAM) 550 using the memory pointer BP6. Moreover, when the command PCMD is a read command, the DMA manager 421-4 may read read data DATA related to the read command PCMD=CMD-6 from the buffer (e.g., DRAM or SRAM) 550 using the memory pointer BP6. For example, the DMA manager 421-4 may write data DATA in the buffer 413-1 or read data DATA from the buffer 413-1 using the buffer controller 427.

When the command PCMD=CMD-6 is a write command, the DMA manager 421-4 may release the seventh command descriptor allocated to the command PCMD=CMD-6 when the write data DATA related to the write command PCMD=CMD-6 are completely stored in a memory region of the buffer 550 designated by the memory pointer BP6.

The DMA manager 421-4 may change a state bit stored in the state data register 520. For example, when the state data register 520 is a register for storing ready and busy state data, the DMA manager 421-4 may change a state bit related to the write command PCMD=CMD-6 from a logic 0 which represents a busy state to a logic 1 which represents a ready state. The buffer 550 may be the buffer 413-1 or the internal memory 425. Here, "ready" means a state in which a command is completely performed or a slot corresponding to the command is empty, and "busy" means a state in which a command is being performed or a state in which a slot corresponding to the command is full.

For example, each slot included in the command slot 510 and each state bit stored in each of the state data registers 520, . . . , 521 may be mapped one-to-one onto each other, and each slot included in the command slot 510 and each command descriptor included in the command descriptor pool 530 may not be mapped one-to-one onto each other.

The host interface module 421 according to at least one example embodiment of the inventive concepts may process a plurality of commands at the same time or in a parallel manner using the command slot 510 and the command descriptor pool 530 for processing one or more commands. That is, each scale-out storage device included in the data storage device 300 may queue commands as many as the number of slots included in the command slot 510 and process queued commands.

The controller 310 may generate a state read command (or a global state read command) for efficiently checking and scheduling a state of each of commands queued in a corresponding scale-out storage device.

The host interface module 421 may queue commands in the command slot 510, and check a ready and busy state data register 520 so as to check whether or not each of the commands is completed. The controller 310 may check states of commands at the same time or in a parallel manner using a global state read command (or state read command). The controller 310 may not only reduce time for checking the states but also improve performance of the data storage device 300.

The controller 310 can complete a corresponding command among commands transmitted to a scale-out storage device or control a transmission time of data to be transmitted from the scale-out storage device during a read operation using global state data output from the scale-out storage device in response to a global state read command.

The controller 310 may check state data for some of the commands transmitted to the scale-out storage device at one time.

Figure 18:
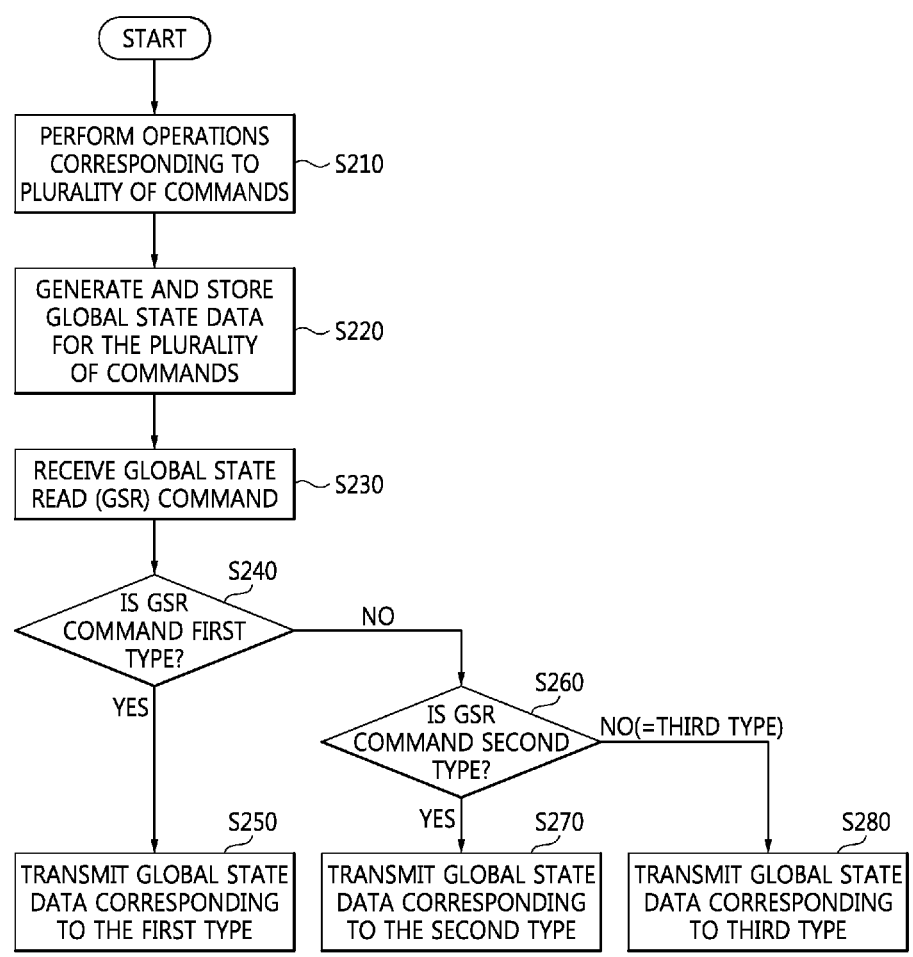
FIG. 18 is a flowchart which describes an operation of the fourth interface shown in FIG. 7.

FIG. 18 is a flowchart which describes an operation of the fourth interface shown in FIG. 7.

Referring to FIGS. 13 to 18, the controller 310 may transmit commands CMD-0 to CMD-k to the scale-out storage device 410-1. The scale-out storage device 410-1 may perform an operation corresponding to each of the commands CMD-0 to CMD-k (S210).

The scale-out storage device 410-1, particularly the host interface module 421, may generate global state data for the commands CMD-0 to CMD-k, and store generated global state data in the state data registers 520, . . . , 521 (S220).

The controller 310 may transmit a global state read GSR command to the scale-out storage device 410-1. The scale-out storage device 410-1 may receive a global state read GSR command (S230), and determine whether or not a received global state read GSR command is a first type (S240). When the global state read GSR command is the first type (YES in S240), the first scale-out storage device 410-1 may transmit global state data corresponding to the first type to the controller 310 (S250). The global state data corresponding to the first type will be described in detail referring to FIGS. 21 to 24.

When the received global state read GSR command is not the first type (NO in S240), the first scale-out storage device 410-1 determines whether or not the received global state read GSR command is a second type (S260). When the global state read GSR command is the second type (YES in S260), the first scale-out storage device 410-1 transmits global state data corresponding to the second type to the controller 310 (S270). The global state data corresponding to the second type will be described in detail referring to FIG. 25.

When the received global state read GSR command is not the second type (NO in S260) and the received global state read GSR command is a third type (NO in S260), the first scale-out storage device 410-1 transmits global state data corresponding to the third type to the controller 310 (S270). The global state data corresponding to the third type will be described in detail referring to FIGS. 23, 24, and 26. Each of the determinations S240 and S260 may be determined by at least one of the command manager 421-1, the command parser 421-2, and the DMA manager 421-4.

Figure 19:
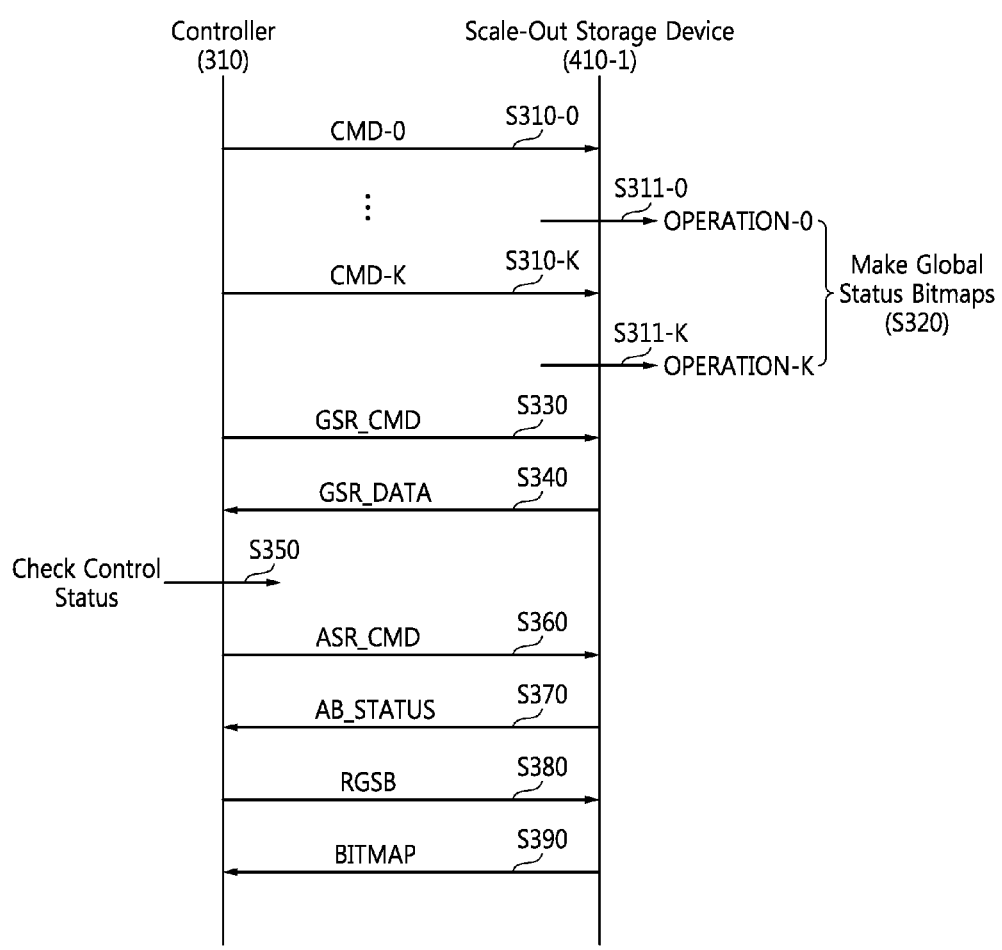
FIG. 19 is a flowchart which describes an operation of the data storage device shown in FIG. 1.
Figure 20:
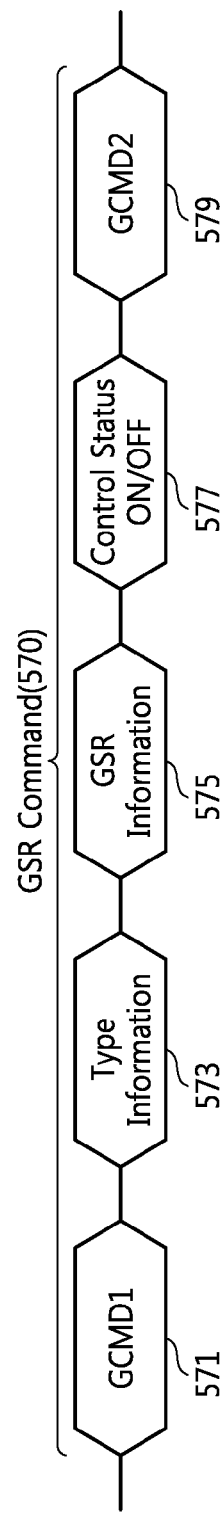
FIG. 20 is an example embodiment of a protocol of a global state read command according to at least one example embodiment of the inventive concepts.
Figure 21:
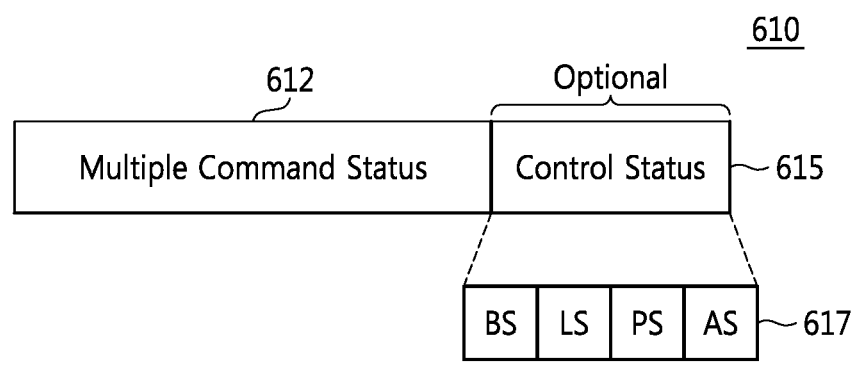
FIG. 21 is an example embodiment of global state data according to a first-type global state read command.
Figure 22:
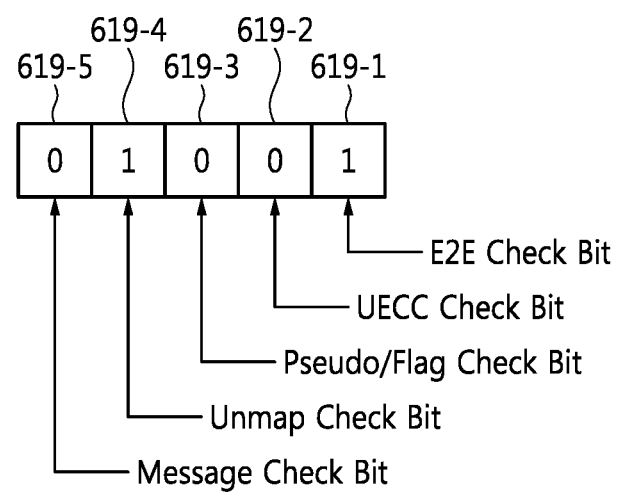
FIG. 22 is an example embodiment of a bit map in an abnormal state shown in FIG. 21.
Figure 23:
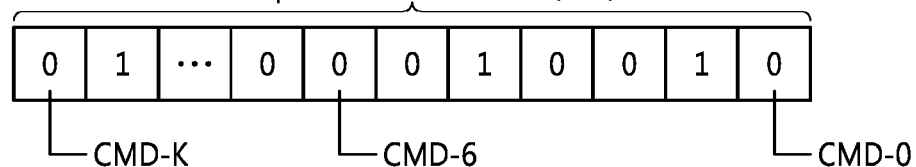
FIG. 23 is an example embodiment in a multi-command state of FIG. 21.
Figure 24:
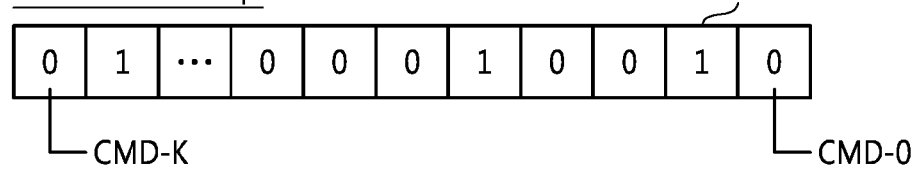
FIG. 24 is an example embodiment of global state data.

FIG. 19 is a flowchart which describes an operation of the data storage device shown in FIG. 1, FIG. 20 illustrates an example embodiment of a protocol of a global state read command according to at least one example embodiment of the inventive concepts, FIG. 21 illustrates an example embodiment of global state data according to a first-type global state read command, FIG. 22 illustrates an example embodiment of a bit map in an abnormal state shown in FIG. 21, FIG. 23 illustrates an example embodiment of a multi-command state of FIG. 21, and FIG. 24 is an example embodiment of global state data.

Referring to FIGS. 19 to 24, the controller 310 may transmit the commands CMD-0 to CMD-k to the first scale-out storage device 410-1 (S310-0 to S310-k). The first scale-out storage device 410-1 may perform an operation of each of the commands CMD-0 to CMD-k (S311-0 to S311-k). For example, some of the commands CMD-0 to CMD-k may be write commands, some of the commands CMD-0 to CMD-k may be read commands, and some of the commands CMD-0 to CMD-k may be non-data commands.

The first scale-out storage device 410-1, particularly the host interface module 421, generates global state data for the commands CMD-0 to CMD-k, and store generated global state data in each of global state data registers 610 and 620 (S320). That is, the first scale-out storage device 410-1, particularly the host interface module 421, may generate bitmaps for the commands CMD-0 to CMD-k based on whether or not each of the commands CMD-0 to CMD-k is performed, and store generated bitmaps in each of the state data registers 610 and 620 (S320). For example, first global state data may be a ready and busy bitmap, and second global state data may be a transmission error E2E bitmap.

The controller 310 may transmit a global state read command GSR_CMD to the first scale-out storage device 410-1 (S330). The first scale-out storage device 410-1 may read first global state data stored in the state data register 610 in response to the global state read command GSR_CMD and transmit multi-command state data (also referred to herein as a "multiple command status") 612 including the first global state data and control state bits 615 to the controller 310 (S340). The control state bits 615 may be selectively transmitted to the controller 310 (S340).

The control state bits 615 may include at least one of a first state bit (BS), a second state bit (LS), a third state bit (PS), and a fourth state bit (AS).

The first state bit (BS) shows whether or not the buffer 413-1 or 425 can store data. That is, the first state bit BS shows whether or not the buffer 413-1 or 425 is full.

The second state bit LS shows whether or not the scale-out storage device 410-1 can further receive a new command output from the controller 310.

The third state bit PS shows how busy the scale out storage device 410-1 is. For example, the third state bit PS shows a state related to performance of the scale-out storage device 410-1.

The fourth state bit AS shows whether or not an error for each of commands transmitted to the scale-out storage device 410-1 from the controller 310 is present.

It is assumed that the scale-out storage device 410-1 transmits the multi-command state data 612 including first global state data and the control state bits 615 including the fourth state bit AS to the controller 310, and the fourth state bit AS is set to be logic 1. That is, the fourth state bit AS is assumed to be an abnormal check bit.

The controller 310 determines whether or not the fourth state bit AS is set to be logic 1 (S350), and transmits an abnormal state data read command ASR_CMD to the scale-out storage device 410-1 (S360). The scale-out storage device 410-1 transmits abnormal state data ABSTATUS to the controller 310 in response to the abnormal state data read command AST_CMD (S370).

As shown in FIG. 22, the abnormal state data ABSTATUS may include at least one of a transmission error check bit 619-1, an uncorrectable error check bit 619-2, a pseudo/flag check bit 619-3, an unmap check bit 619-4, and a message check bit 619-5.

A transmission error may be an error which may occur in a command while the command is transmitted through an interface. An uncorrectable error may be an uncorrectable ECC error.

The pseudo/flag check bit may be transmitted to the controller 310 during a read operation related to a read command as a check bit for a sector in which a pseudo/flag sector bitmap is set.

The unmap check bit may be transmitted to the controller 310 during a read operation related to a read command as a check bit for a sector in which a trimmed sector bitmap is set.

The message check bit is a bit for transmission of data in a small size to the controller 310 from the scale-out storage device 410-1.

The controller 310 may transmit a transmission command RGSB which requires transmission of the transmission error state bitmap 620 to the scale-out storage device 410-1 based on the abnormal state data ABSTATUS (S380). The scale-out storage device 410-1 may transmit the transmission error state bitmap 620 shown, as an example, in FIG. 24 to the controller 310 in response to the transmission command RGSB (S390).

The transmission command RGSB requiring transmission of the transmission error state bitmap 620 as shown and described in FIG. 19 is only an example. Accordingly, the controller 310 may transmit the uncorrectable error bitmap, the pseudo/flag error bitmap, the unmap bitmap, or the transmission command RGSB requiring transmission of a message to the scale-out storage device 410-1 based on the abnormal state data ABSTATUS.

Referring to FIG. 20, a global state read command 570 may include a first command 571, type information 573, global state read information 575, control state on/off 577, and a second command 579.

The first command 571 instructs a start of the global state read command 570, and the type information 573 instructs a type of the global state read command 570. The type may be classified into a first type, a second type, and a third type; however, it is not limited thereto. The global state read information 575 may include information on from which of commands queued in the scale-out storage device 410-1 to read state data.

The control state on/off 577 may be used to instruct whether or not to use the control state bits 615 included in state data. For example, when the control state on/off 577 is turned on, the scale-out storage device 410-1 may transmit state data including the control state bits 615 to the controller 310. However, when the control state on/off 577 is turned off, the scale-out storage device 410-1 may transmit state data not including the control state bits 615 to the controller 310. The second command 579 instructs an end of the global state read command 570.

The first type may be used to read state data for commands of a number (for example, a natural number of two or more) designated by the controller 310. Accordingly, the controller 310 may determine whether or not each of the commands is completed based on state data output from the scale-out storage device.

The second type may be used to read state data for commands related to a designated type or a designated operation. Accordingly, the controller 310 may determine whether or not each of the commands is completed based on state data output from the scale-out storage device. For example, the scale-out storage device 410-1 may selectively transmit state data for write commands among the queued commands, state data for read commands, or state data for non-data commands to the controller 310 in response to the global state read command 570 including information on the second type.

The third type may be used to read state data for designated commands only. Accordingly, the controller 310 may check each of the designated commands based on state data output from the scale-out storage device. For example, the controller 310 may read state data (FIG. 23) which show a ready state or a busy state of the queued commands or state data (FIG. 24) for a transmission error from the scale-out storage device 410-1 using a global state read command having the third type.

Figure 25:
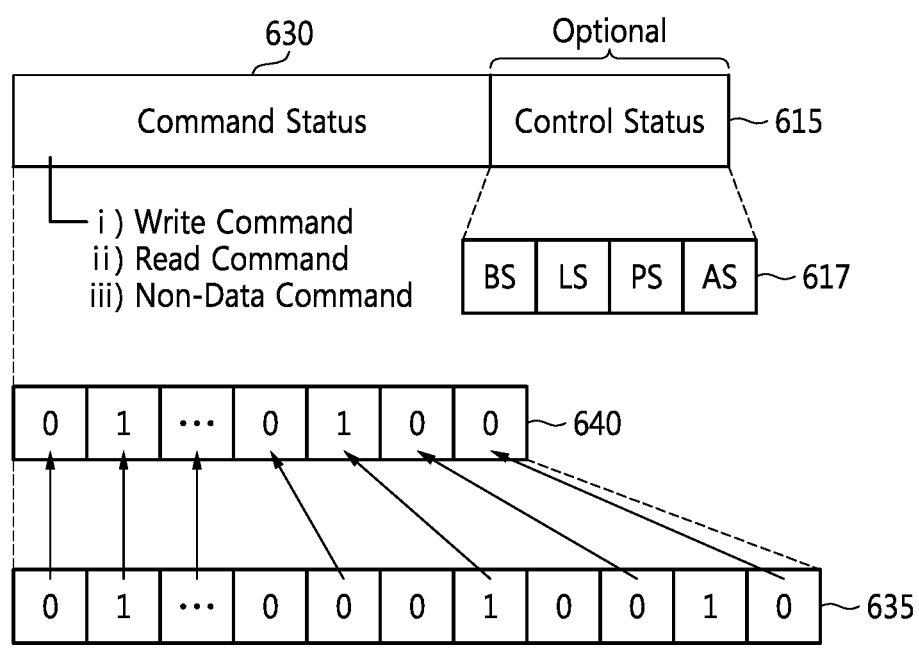
FIG. 25 is an example embodiment of the global state data according to a second-type global state read command.

FIG. 25 is an example embodiment of global state data according to a second type global state read command. Referring to FIGS. 19, 20, and 25, when the type information 573 of the global state read command 570 is set to be the second type, the scale-out storage device 410-1 may transmit state data including command state data 630 to the controller 310. As described above, transmission of the control state bits 615 may be determined according to the control state on/off 577 included in the global state read command 570.

The scale-out storage device 410-1 may extract state data 640 for specific commands (for example, write commands, read commands, or non-data commands) from state data 635 for all queued commands, and transmit extracted state data 630 to the controller 310.

Figure 26:
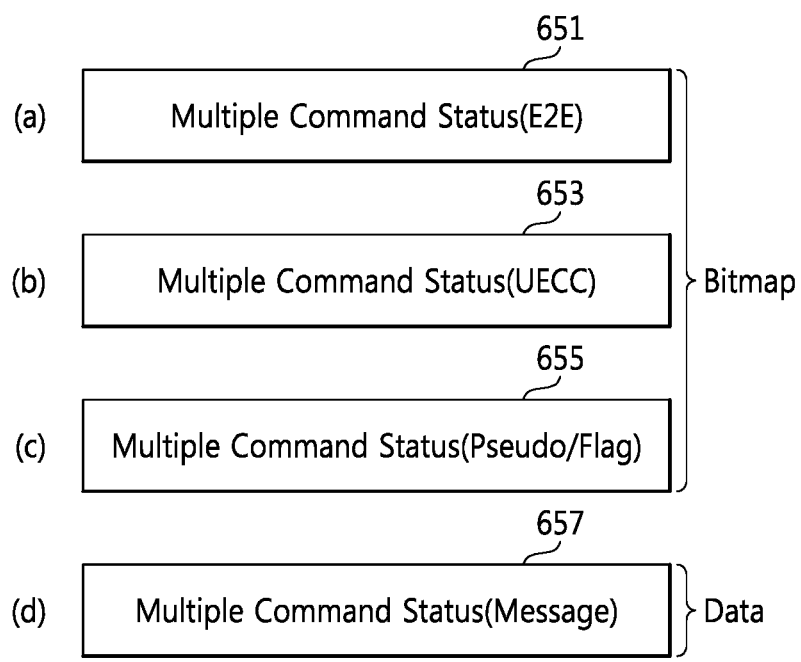
FIG. 26 shows at least some example embodiments of the global state data.

FIG. 26 shows at least some example embodiments of global state data.

Item (a) of FIG. 26 is multiple command state data 651 which show a transmission error for queued commands, item (b) of FIG. 26 is multiple command state data 653 which show an uncorrectable error for the queued commands, item (c) of FIG. 26 is multiple command state data 655 including the pseudo/flag 655 for the queued commands, and item (d) of FIG. 26 is multiple command state data 657 including a message. For example, each of the multiple command state data 651, 653, and 655 may be embodied in a bitmap.

Figure 27:
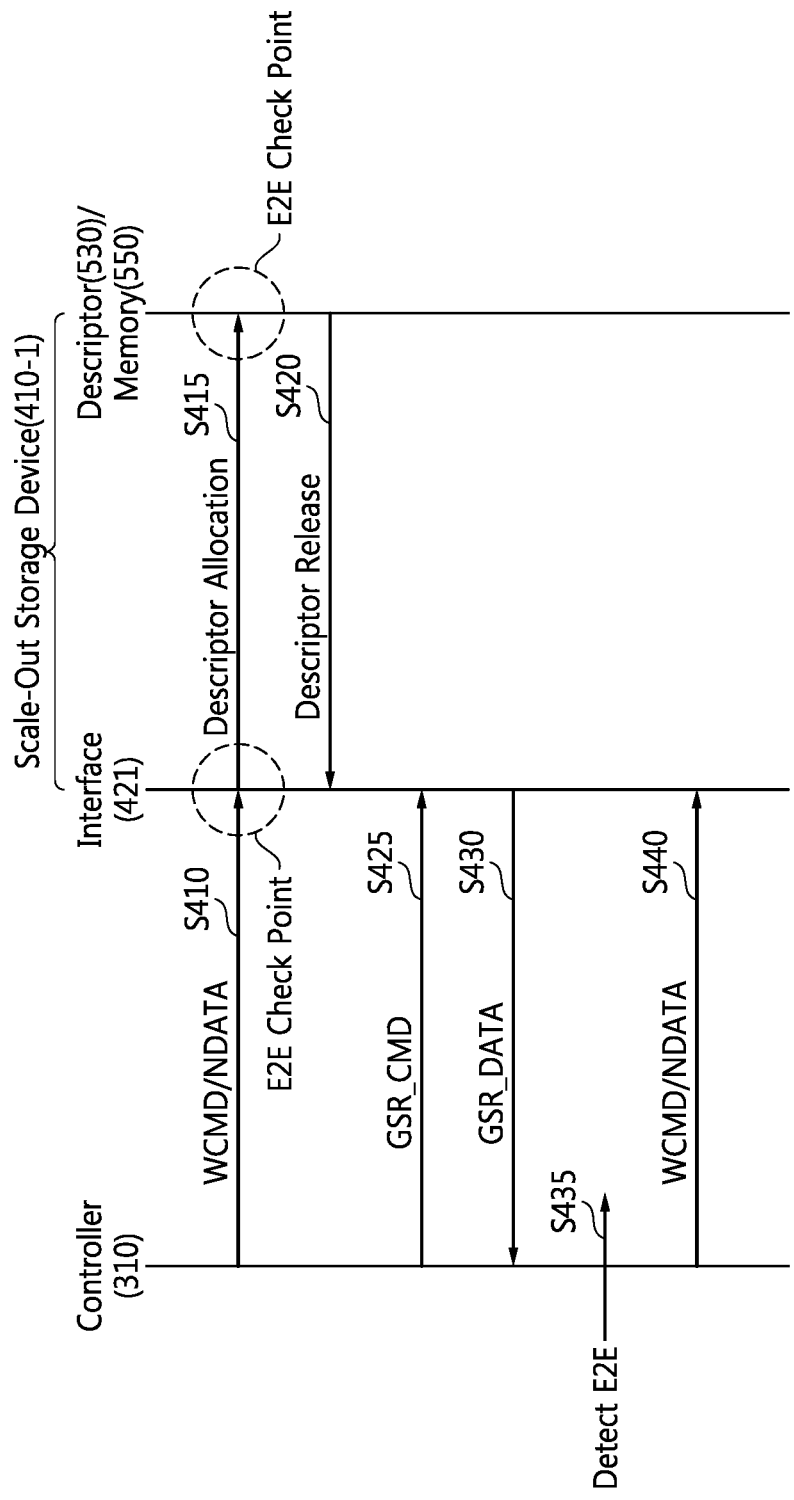
FIG. 27 is a data flow which shows an example embodiment of an error processing procedure of the data storage device shown in FIG. 1.

FIG. 27 is a data flow which shows an example embodiment of an error processing procedure of the data storage device shown in FIG. 1. A transmission error may occur in a procedure in which a command is transmitted between the controller 310 and the scale-out storage device 410-1. When the command is a write command, a transmission error for the write command may occur in a procedure in which the write command is transmitted. Moreover, when the command is a read command, a transmission error for the read command may occur in a procedure in which the read command is transmitted, or a transmission error for the read data may occur in a procedure in which read data related to the read command are transmitted.

The controller 310 may transmit data (for example, inter process communication (IPC) data) related to a non-data write command NDATA and a non-data write command NDATA to the scale-out storage device 410-1 through the interfaces 350 and 421 (S410). A transmission error may occur due to the interfaces 350 and 421.

In addition, the controller 310 may transmit a write command WCMD and data (for example, user data) related to the write command WCMD to the scale-out storage device 410-1 through the interfaces 350 and 421 (S410). A transmission error may occur due to the interfaces 350 and 421. The scale-out storage device 410-1 may allocate a valid command descriptor included in the command descriptor pool 530 to the write command WCMD, store the write command WCMD in an allocated command descriptor, and write data related to the write command WCMD in the memory 550 (S415). A transmission error may occur in a procedure in which the write command WCMD is stored in the allocated command descriptor.

When a transmission error occurs in a procedure in which the write command WCMD is transmitted, the scale-out storage device 410-1 may generate a state bit which indicates occurrence of the transmission error and store the state bit in a register.

After data related to the write command WCMD are written in the memory 550, the command descriptor allocated to the write command WCMD is released (S420).

The controller 310 transmits a global state read command GSR_CMD to the scale-out storage device 410-1 (S425). The scale-out storage device 410-1 transmits state data GSR_DATA including a state bit which indicates occurrence of a transmission error in a procedure in which the non-data write command NDATA or the write command WCMD is transmitted to the controller 310 in response to the global state read command GSR_CMD (S430).

The controller 310 checks the state bit and detects an occurrence of the transmission error E2E (S435). The controller 310 re-issues the write command WCMD or the non-data write command NDATA (S440).

Figure 28:
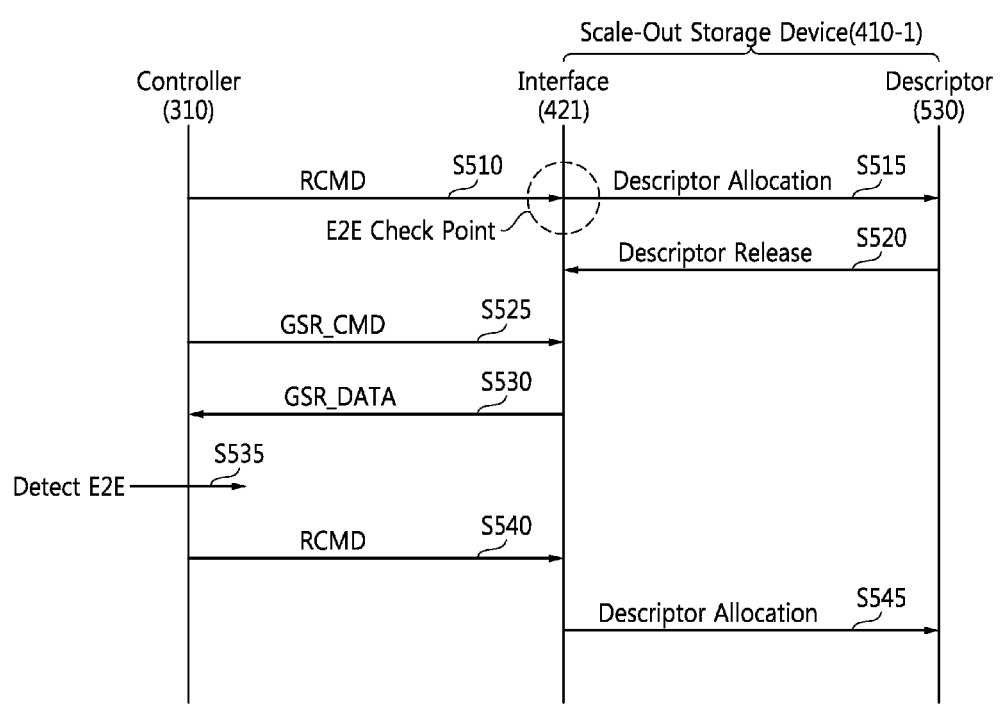
FIG. 28 is a data flow which shows at least another example embodiment of the error processing procedure of the data storage device shown in FIG. 1.

FIG. 28 is a data flow which shows at least another example embodiment of the error processing procedure of the data storage device shown in FIG. 1. The controller 310 may transmit a read command RCMD to the scale-out storage device 410-1 through the interfaces 350 and 421 (S510). The transmission error E2E may occur due to the interfaces 350 and 421. The scale-out storage device 410-1 may allocate a valid command descriptor included in the command descriptor pool 530 to the read command RCMD, store the read command RCMD in an allocated command descriptor, and read data related to the read command RCMD from the memory 550.

When a transmission error occurs in a procedure in which the read command RCMD is transmitted, the scale-out storage device 410-1 may generate a state bit which indicates occurrence of the transmission error and store the state bit in a register.

After data related to the read command RCMD are read from the memory 550, the command descriptor allocated to the read command RCMD is related (S520).

The controller 310 transmits the global state read command GSR_CMD to the scale-out storage device 410-1 (S425). The scale-out storage device 410-1 transmits state data GSR_DATA including a state bit which indicates occurrence of a transmission error in the procedure in which the read command RCMD is transmitted to the controller 310 in response to the global state read command GSR_CMD (S530).

The controller 310 checks the state bit and detects occurrence of the transmission error E2E (S535). The controller 310 re-issues the read command RCMD (S540). The scale-out storage device 410-1 allocates a valid command descriptor included in the command descriptor pool 530 to the read command RCMD and store the read command RCMD in the allocated command descriptor (S545).

Figure 29:
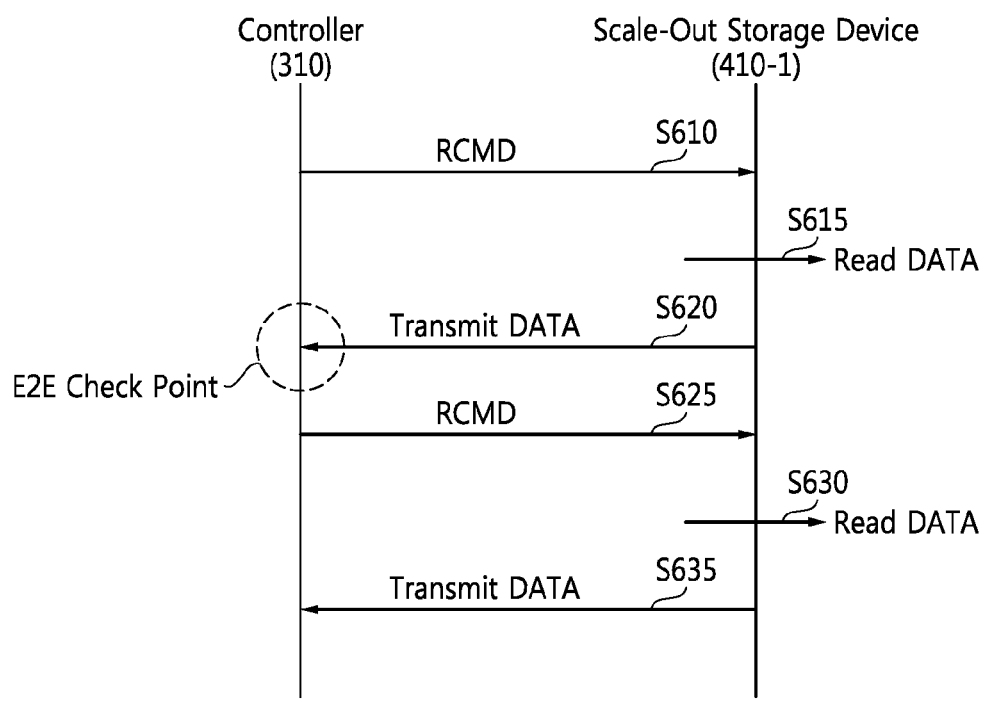
FIG. 29 is a data flow which shows still at least another example embodiment of the error processing procedure of the data storage device shown in FIG. 1.

FIG. 29 is a data flow which shows still at least another example embodiment of the error processing procedure of the data storage device shown in FIG. 1.

The controller 310 may transmit the read command RCMD to the scale-out storage device 410-1 through the interfaces 350 and 421 (S610). The scale-out storage device 410-1 may allocate a valid command descriptor included in the command descriptor pool 530 to the read command RCMD, store the read command RCMD in the allocated command descriptor, and read data related to the read command RCMD from the memory 550 (S615). When the data related to the read command RCMD are read form the memory 550, the command descriptor allocated to the read command RCMD is released.

The scale-out storage device 410-1 transmits data related to the read command RCMD and parity data for the data to the controller 310 (S620). The controller 310 determines whether or not a transmission error is included in the data related to the read command RCMD based on the parity data.

The controller 310 may transmit the read command RCMD to the scale-out storage device 410-1 through the interfaces 350 and 421 for a read retry of the data when the transmission error occurs (S625). The scale-out storage device 410-1 may allocate a valid command descriptor included in the command descriptor pool 530 to the read command RCMD, stores the read command RCMD in the allocated command descriptor, and read the data related to the read command RCMD from the memory 550 (S630). After the data related to the read command RCMD are read from the memory 550, the command descriptor allocated to the read command RCMD is released.

The scale-out storage device 410-1 transmits the data related to the read command RCMD and parity data for the data to the controller 310 (S635).

Figure 30:
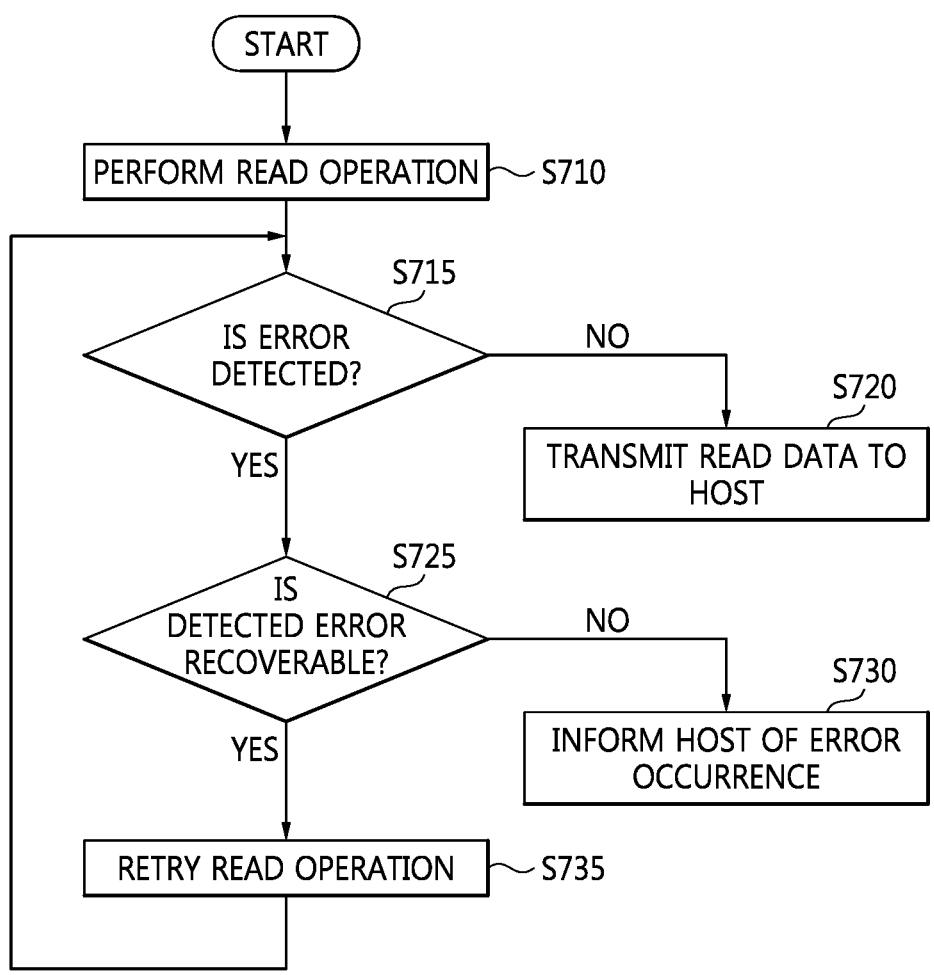
FIG. 30 is a flow chart which shows an example embodiment of the error processing procedure of the data storage device shown in FIG. 1.

FIG. 30 is a flow chart which shows an example embodiment of the error processing procedure of the data storage device shown in FIG. 1. Referring to FIGS. 19, 21, 22, 26, and 30, the scale-out storage device 410-1 may perform a read operation based on a read command output from the controller 310 (S710). The scale-out storage device 410-1 may transmit the data related to the read command and parity data to the controller 310.

The controller 310 may determine whether or not an error is included in the data based on the parity data (S715). When an error is not detected, the controller 310 may transmit the data to the host 200 (S720). When an error is detected, the controller 310 needs to determine whether the error is a transmission error or an uncorrectable error. Accordingly, the controller 310 transmits the global state read command GSR_CMD to the scale-out storage device 410-1, and transmits an abnormal state data read command ASR_CMD to the scale-out storage device 410-1 based on the control state bits 615 included in the global state data GSR_DATA transmitted from the scale-out storage device 410-1.

The controller 310 receives abnormal state data AB_STATUS transmitted from the scale-out storage device 410-1, and transmits a transmission command RGSB which instructs a transmission of state data 651 for a transmission error and/or state data 653 for an uncorrectable error to the scale-out storage device 410-1.

The controller 310 may receive the state data 651 for a transmission error transmitted from the scale-out storage device 410-1 and/or the state data 653 for an uncorrectable error, and determine whether or not a detected error is a recoverable (or correctable) error (S725).

When a detected error is an unrecoverable (or uncorrectable) error, the controller 310 does not perform a read-retry operation and transmit an indication signal which indicates occurrence of the unrecoverable (or uncorrectable) error to the host 200 (S730). However, when the detected error is a recoverable (or correctable) error, the controller 310 performs a read retry operation (S735). The controller 310 determines whether or not an error is included in data read by the read retry operation (S715).

Figure 31:
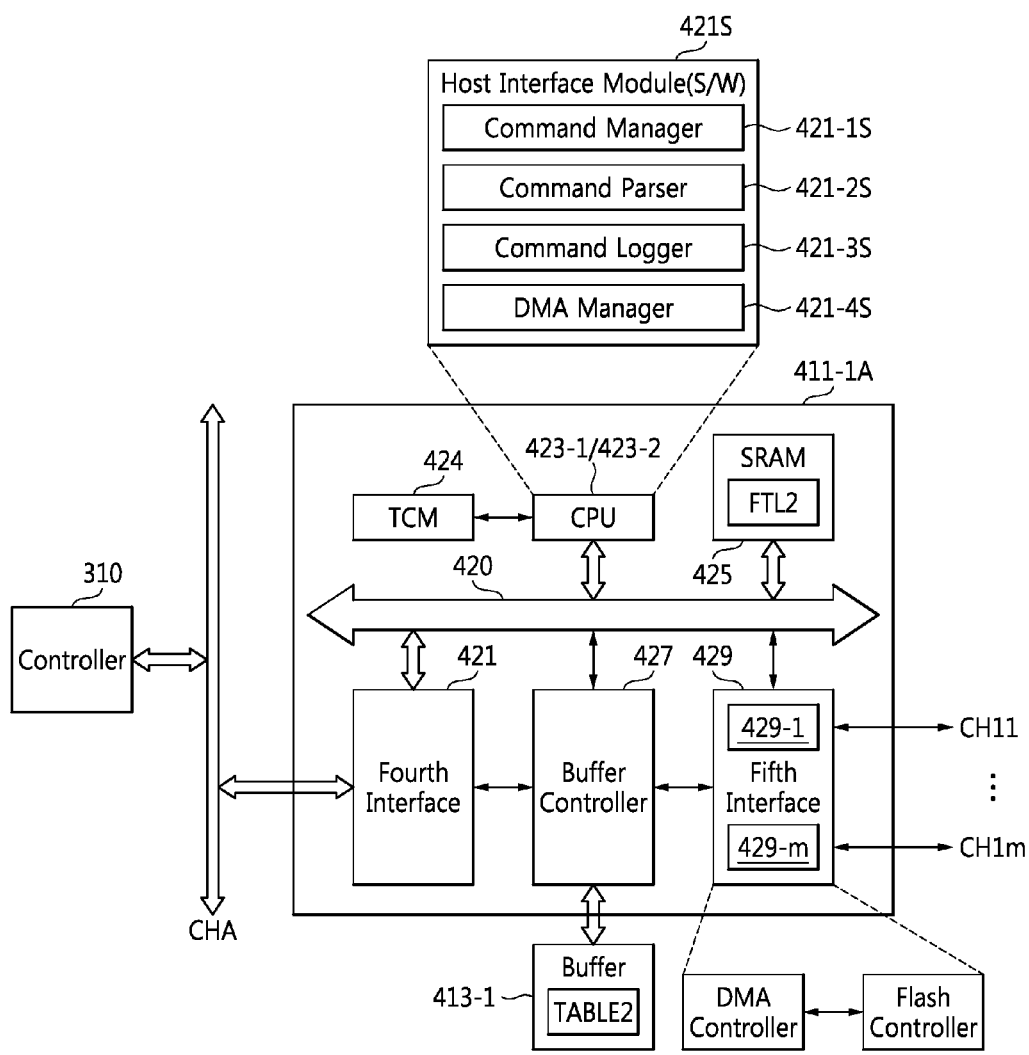
FIG. 31 is a block diagram of a data storage device which includes a CPU performing a host interface module when a host interface module according to at least one example embodiment of the inventive concepts is embodied in software.

FIG. 31 is a block diagram of a data storage device which includes a CPU performing a host interface module when the host interface module according to at least one example embodiment of the inventive concepts is embodied in software.

Referring to FIG. 31, a host interface module 421S according to at least one example embodiment of the inventive concepts may be embodied in software which can be executed in the CPU 423-1 and/or 423-2. A function of each software component 421-1S, 421-2S, 421-3S, or 421-4S is substantially the same as a function of each hardware component 421-1, 421-2, 421-3, or 421-4 described referring to FIGS. 13 to 17, such that description for the function of each software component 421-1S, 421-2S, 421-3S, or 421-4S will be omitted.

FIG. 32 is a block diagram which schematically shows a processing module generating a command protocol and a global state read command according to at least one example embodiment of the inventive concepts. Referring to FIG. 32, a processing module 700 may be embodied in hardware components or software components.

According to at least some example embodiments, when the processing module 700 is embodied in hardware components 710, 720, 730, and 740, the processing module 700 may be embodied in the inside or the outside of the CPU 330 and/or 331. Moreover, when the processing module 700 is embodied in software components 710, 720, 730, and 740, the processing module 700 may be performed by the CPU 330 and/or 331.

The processing module 700 may include a command scheduler 710, a command generator 720, transmission command queues 730, and a global state data interpreter 740. The command scheduler 710 may schedule at least one command to be transmitted to each scale-out storage device included in the data storage device 300.

The command generator 720 may generate at least one command transmitted to the each scale-out storage device according to a control of the command scheduler 710. The command may include a command related to a transfer of data, a command related to a transfer of data of a small size (e.g., 32 bytes) that does not result in the transfer of the data, a global state read command, an abnormal state data read command, a transmission command, or a command described in the present specification.

The transmission command queues 730 may be a memory which can queue commands generated from the command generator 720 and transmitted to each scale-out storage device or information on the commands.

The global state data interpreter 740 may interpret state data transmitted to each scale-out storage device, and transmit a result of the interpretation to the command scheduler 710 and/or the command generator 720.

Figure 33:
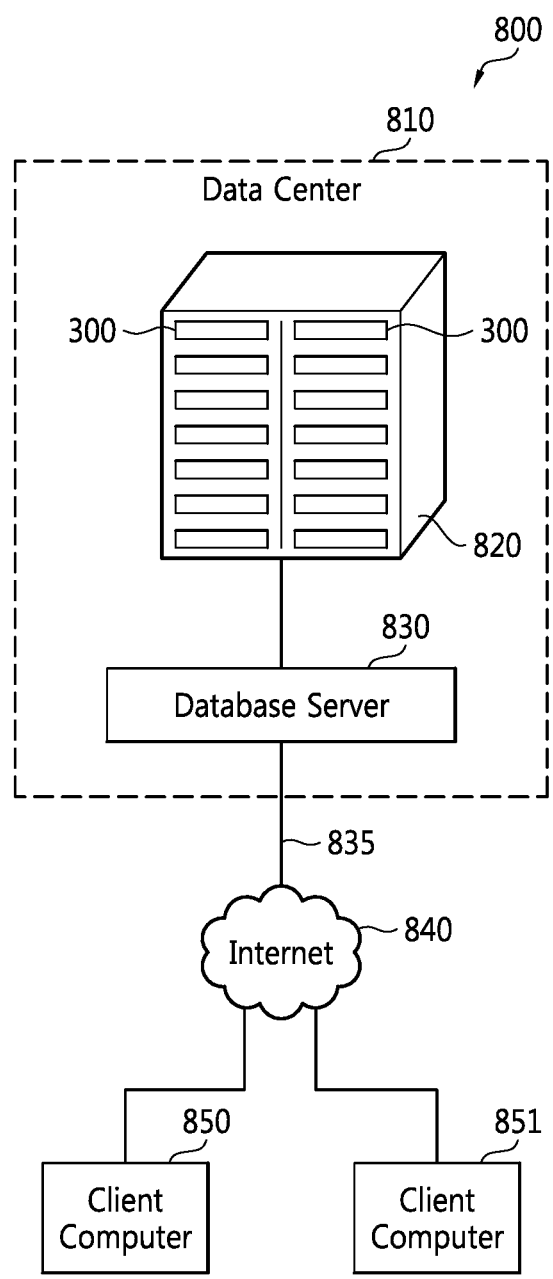
FIG. 33 is a block diagram of the data processing system which includes the data storage device shown in FIG. 1.

FIG. 33 is a block diagram of a data processing system which includes the data storage device shown in FIG. 1. Referring to FIGS. 1 to 33, a data processing system 800 may include a database 820, a database server 830, a second network 840, and a plurality of client computers 850 and 851. A data center, an internet data center, or a cloud data center 810 may include the database 820 and the database server 830.

The database 820 may include a plurality of data storage devices 300. The plurality of data storage devices 300 may be installed in a rack. A structure and an operation of the data storage device 300 may be substantially the same as or similar to a structure and an operation of the data storage device 300 described referring to FIGS. 1 to 31.

The database server 830 may control an operation of each of the plurality of data storage devices 300. For example, the database server 830 may perform a function of the host 200 shown in FIG. 1. The database server 830 may be connected to a second network 840, e.g., the internet or Wi-Fi, through the first network 835, e.g., a Local Area Network (LAN). Each of the plurality of client computers 850 and 851 may be connected to the database server 830 through the second network 840.

A data storage device having a scale-out structure according to at least one example embodiment of the inventive concepts may use a command queuing method to improve performance of a scale-out storage device. The data storage device according to at least one example embodiment of the inventive concepts may check state data on commands queued in a scale-out storage device at one time, thereby reducing time in checking states for the queued commands.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A data storage device comprising:
a first controller;
a scale-out storage device; and
an interface connected between the first controller and the scale-out storage device,
wherein the first controller is configured to transmit a first command to the scale-out storage device through the interface, and the first command includes a command type and command information having a parameter with respect to the command type,
wherein the scale-out storage device is configured to perform an operation corresponding to the first command,
wherein the scale-out storage device includes,
a scale-out controller connected to the interface,
a volatile memory connected to the scale-out controller, and
a non-volatile memory connected to the scale-out controller, and wherein the first controller includes a command generator configured to generate the first command, and
wherein the command generator is configured to,
further generate a command index for facilitating command queuing, a flag indicating an attribute of the first command, and parity data which indicates data integrity for the first command, and
transmit the first command including the command index, the flag, the command information, and the parity data to the scale-out storage device through the interface.

2. The data storage device of claim 1, wherein the interface is a NAND interface, the volatile memory is a dynamic random access memory (DRAM), the non-volatile memory is a NAND flash memory, and the data storage device is a solid state drive (SSD).

3. The data storage device of claim 1, wherein the first command is transmitted in address cycles.

4. The data storage device of claim 1, wherein the scale-out controller includes a command manager configured to allocate the first command to a first slot corresponding to the command index among a plurality of slots and allocates a valid command descriptor buffer among a plurality of command descriptor buffers as a first command descriptor buffer for storing the first command.

5. The data storage device of claim 4, wherein the scale-out controller further includes a direct memory access (DMA) manager and the scale-out controller is configured such that when the first command is a command to access the volatile memory, the DMA manager reads the command information from the first command descriptor buffer referring to the command information stored in the first slot and accesses a memory region of the volatile memory using a memory pointer included in the read command information.

6. The data storage device of claim 4, wherein the scale-out controller further includes a direct memory access (DMA) manager and the scale-out controller is configured such that when the first command is a write command for the volatile memory and write data related to the write command are completely stored in a memory region of the volatile memory, the DMA manager releases the first command descriptor buffer allocated to the command.

7. The data storage device of claim 1, wherein the scale-out controller includes:
a central processing unit (CPU) configured to execute a flash translation layer (FTL) that converts a logical command into a physical command,
a memory controller configured to control an operation of the non-volatile memory based on the physical command, and
a command parser configured to,
determine whether the first command is the physical command or the logical command by parsing the first command, and
transmit parsed command information to the FTL or to the memory controller according to a result of the determination.

8. The data storage device of claim 7, wherein the scale-out controller further includes a command logger which logs,
at least a portion of the command information,
a reception time of the first command, and
a completion time of the operation corresponding to the first command.

9. The data storage device of claim 1,
wherein the first controller is configured to transmit a first state read command to the scale-out storage device through the interface,
wherein the scale-out controller is configured such that, in response to the first state read command, the scale-out controller transmits state data for each of a plurality of commands queued in the scale-out controller to the first controller through the interface at a time, and
wherein the plurality of commands includes the first command.

10. The data storage device of claim 9, wherein the plurality of commands includes different types of commands.

11. The data storage device of claim 9, wherein the plurality of commands includes a same type of commands only.

12. The data storage device of claim 9, wherein the state data includes:
data for a current operation state related to each of the plurality of commands,
data for an error state related to each of the plurality of commands, or
data for an error type included in data related to each of the plurality of commands.

13. The data storage device of claim 9, wherein the state data includes at least one of:
first state data which indicates whether or not the volatile memory stores data;
second state data which indicates whether or not the scale-out storage device further receives a second command output from the first controller; and
third state data which indicates how busy the scale-out storage device is.

14. The data storage device of claim 9, wherein,
the first controller is configured to transmit a second state read command to the scale-out storage device through the interface in response to an abnormal check bit included in the state data, and
the scale-out controller is configured to transmit an error state bitmap for each of the plurality of commands to the first controller through the interface in response to the second state read command.

15. A data processing system comprising:
a host; and
a data storage device connected to the host,
wherein the data storage device includes,
a first controller,
a scale-out storage device, and
an interface connected between the first controller and the scale-out storage device,
wherein the first controller is configured to transmit a first command to the scale-out storage device through the interface, the first command including a command type and command information including a parameter for the command type,
wherein the scale-out storage device is configured to perform an operation corresponding to the first command,
wherein the scale-out storage device includes,
a scale-out controller connected to the interface,
a volatile memory connected to the scale-out controller, and
a non-volatile memory connected to the scale-out controller,
wherein the first controller includes a command generator configured to generate the first command, and wherein the command generator is configured to,
further generate a command index for facilitating command queuing, a flag indicating an attribute of the first command, and parity data which indicates data integrity for the first command, and
transmit the first command including the command index, the flag, the command information, and the parity data to the scale-out storage device through the interface.

16. A data storage device comprising:
a first controller;
a first storage device; and
an interface connected between the first controller and the first storage device,
the first controller being configured to transmit a plurality of commands to the first storage device through the interface,
the first storage device including a second controller configured to queue the plurality of commands,
the first controller being further configured to send a global state read command to the first storage device,
the second controller being configured to respond to the global state read command by sending global state data to the first controller,
the global state data indicating a plurality of statuses of the queued plurality of commands, respectively,
wherein at least a first command from among the plurality of commands includes a command type, command information having a parameter with respect to the command type, parity data that indicates data integrity for the first command, a command index for facilitating command queuing and a flag indicating an attribute of the first command.

17. The data storage device of claim 16, wherein,
the first storage device is a scale-out storage device configured to perform operations corresponding to the queued plurality of commands,
the second controller is a scale-out controller connected to the interface, and
the scale-out storage device further includes,
a volatile memory connected to the scale-out controller, and
a non-volatile memory connected to the scale-out controller.

* * * * *